United States Patent [19]

Betensky

[11] Patent Number: 4,801,196
[45] Date of Patent: Jan. 31, 1989

[54] WIDE ANGLE PROJECTION LENS

[75] Inventor: Ellis I. Betensky, Redding, Conn.

[73] Assignee: U.S. Precision Lens, Incorporated, Cincinnati, Ohio

[21] Appl. No.: 776,140

[22] Filed: Sep. 13, 1985

Related U.S. Application Data

[63] Continuation-in-part of Ser. No. 642,825, Aug. 21, 1984, Pat. No. 4,697,892, which is a continuation-in-part of Ser. No. 543,017, Oct. 18, 1983, abandoned, Continuation-in-part of Ser. No. 652,062, Sep. 19, 1984, Pat. No. 4,707,084, which is a continuation-in-part of Ser. No. 642,825, Aug. 21, 1984, Pat. No. 4,697,892, which is a continuation-in-part of Ser. No. 543,017, Oct. 18, 1983, abandoned.

[51] Int. Cl.$^4$ .................. G02B 13/18; G02B 9/00; G02B 9/34
[52] U.S. Cl. .................. 350/432; 350/412; 350/469
[58] Field of Search .................. 350/432, 412, 469

[56] References Cited

U.S. PATENT DOCUMENTS

| | | |
|---|---|---|
| 2,440,088 | 4/1948 | Grey . |
| 2,468,564 | 4/1949 | Luneburg . |
| 2,479,907 | 8/1949 | Cox . |
| 2,502,543 | 4/1950 | Warmisham . |
| 2,552,672 | 5/1951 | Grey . |
| 2,638,034 | 5/1953 | Wreathall . |
| 2,660,094 | 11/1953 | Wreathall . |
| 2,737,849 | 3/1956 | Tiller . |
| 3,429,997 | 2/1969 | Rosner et al. . |
| 3,800,085 | 3/1974 | Ambats et al. . |
| 3,868,173 | 2/1975 | Miles et al. . |
| 3,951,523 | 4/1976 | Nishimoto . |
| 3,998,527 | 12/1976 | Ikeda et al. . |
| 4,300,817 | 11/1981 | Betensky . |
| 4,348,081 | 9/1982 | Betensky . |
| 4,526,442 | 7/1985 | Betensky . |
| 4,666,261 | 5/1987 | Arai .................. 350/432 |
| 4,697,892 | 10/1987 | Betensky .................. 350/412 |
| 4,699,476 | 10/1987 | Clarke .................. 350/432 |
| 4,704,009 | 11/1987 | Yamamoto et al. .................. 350/412 |
| 4,707,084 | 11/1987 | Betensky .................. 350/432 |

FOREIGN PATENT DOCUMENTS

| | | |
|---|---|---|
| 57-101812 | 6/1982 | Japan . |
| 57-108815 | 7/1982 | Japan . |
| 57-108818 | 7/1982 | Japan . |
| 57-177115 | 10/1982 | Japan . |
| 58-125007 | 7/1983 | Japan . |
| 58-118616 | 7/1983 | Japan . |
| 58-140708 | 8/1983 | Japan . |
| 58-139110 | 8/1983 | Japan . |
| 58-139111 | 8/1983 | Japan . |
| 59-133518 | 7/1984 | Japan . |
| 59-133517 | 7/1984 | Japan . |
| 59-121016 | 7/1984 | Japan . |
| 59-170812 | 9/1984 | Japan . |
| 59-219709 | 12/1984 | Japan . |
| 593514 | 10/1947 | United Kingdom . |
| 1269133 | 4/1972 | United Kingdom . |

OTHER PUBLICATIONS

Cox "A System of Optical Design" published by Focal Press 1965, pp. 470–482.
Diagrams by Applicant Entitled "Advent Lens Mod II".
"Minimax Approximation by a Semi-Circle" by Charles B. Dunham and Charles R. Crawford, published in the Society for Industrial and Applied Mathematics Journal, vol. 17, No. 1, Feb. 1980.

*Primary Examiner*—John K. Corbin
*Assistant Examiner*—Ronald M. Kachmarik
*Attorney, Agent, or Firm*—Costas & Montgomery

[57] ABSTRACT

A wide angle projection lens which comprises from the image end a first lens unit of negative power having at least one aspheric surface, a second positive lens unit comprising at least two elements and a third negative element having an aspheric concave to the image, where the first lens unit provides negative power to the overall lens and serves as an aberration corrector including some field curvature.

67 Claims, 3 Drawing Sheets

WIDE ANGLE PROJECTION LENS

RELATED APPLICATIONS

This application is a continuation-in-part of application Ser. No. 642,825, filed Aug. 21, 1984, now Pat. No. 4,697,892, which is a continuation-in-part of application Ser. No. 543,017, filed Oct. 18, 1983, now abandoned. This application is also a continuation-in-part of application Ser. No. 652,062, filed Sept. 19, 1984, now Pat. No. 4,707,084, which is a continuation-in-part of application Ser. No. 642,825, now Pat. No. 4,697,892 filed Aug. 21, 1984, which was a continuation-in-part of application Ser. No. 543,017, filed Oct. 18, 1983, now abandoned.

FIELD OF THE INVENTION

This invention relates to projection lenses, and more particularly, relates to projection lenses for wide screen television.

BACKGROUND OF THE INVENTION

A preferred form of projection lenses for wide screen television is disclosed in U.S. Pat. Nos. 4,348,081, 4,300,817 and 4,526,442, all assigned to the assignee of the present application.

In these previous patents, the lens units have been referred to as groups which perform specific or distinct optical functions. However, in accordance with present United States Patent and Trademark Office requirements, the overall lens will be defined in terms of optical "units". It will be understood that the term "units" refers to one or more optical elements or components air spaced from another optical unit.

It is well known that a specified optical function(s) of a lens unit in an overall lens may be accomplished by using one element or component or more than one element or component dependent upon the correction or function desired. A decision as to whether one or more elements is used as a lens unit in an overall lens design may be based on various considerations, including but not limited to, ultimate performance of the overall lens, ultimate costs of the lens, acceptable size of the lens, etc. Accordingly, in the following specification and appended claims, the term "lens unit" refers to one or more lens elements or lens components which provide a defined optical function or functions in the design of the overall lens.

The lenses disclosed in the aforementioned patents generally comprise three lens units: from the image end a first lens unit, having at least one aspheric surface, which serves as an aberration corrector; a second lens unit including a biconvex element which supplies all or substantially all of the positive power of the lens; and a third lens unit having a concave surface towards the image end of the lens, serving as a field flattener, and essentially correcting the Petzval curvature of the first and second groups.

The lenses, as disclosed, are designed for use with a surface of a cathode ray tube (CRT). The lenses of U.S. Pat. No. 4,300,817, utilizing a single biconvex element in the second lens unit, all have an equivalent focal length (EFL) of one hundred twenty-seven millimeters or greater, while the lenses of U.S. Pat. No. 4,348,081, which utilize a two-element lens unit, including the biconvex element, may have an EFL reduced to eighty-five millimeters as designed for direct projection for a five inch diagonal CRT. The lenses described in U.S. Pat. No. 4,526,442 are designed to have a fold in the optical axis between the first and second lens units and have been designed so that the EFL is as low as one hundred twenty-six millimeters. These EFL's are for CRT screens having a viewing surface with an approximate five inch diagonal.

Projection TV sets are rather bulky and have required high volume cabinets. One manner of reducing the cabinet size is to decrease the EFL of the projection lenses. This, of course, increases the field angle of the lens.

A further consideration is introduced wherein a spacing is provided between the phosphor screen of the CRT and the third lens unit of the projection lens. This spacing may be required for the inclusion of a liquid cooling material and a window necessary to enclose the coolant against the face of the CRT. This additional spacing between the face of the CRT causes the third negative lens unit to contribute more negative power, which must be compensated by increased power in the positive second lens unit.

An effect of increasing the angular coverage of the lens as a result of decreasing the EFL, is that the aberrations become more difficult to correct. A single biconvex element second lens unit, as shown in the aforementioned patents, does not provide the lens designer adequate degrees of freedom to correct for the resulting astigmatism and distortion. By dividing the optical power of the second lens unit, as disclosed in U.S. Pat. No. 4,348,081, the EFL may be shortened. However, merely splitting the optical power of the second lens unit into two elements to obtain additional degrees of optical design freedom, does not provide acceptable contrast and resolution where the angular coverage of the projection lenses is required to be in excess of twenty-seven degrees, semi-field.

The EFL of the lens is a function in the total conjugate distance between the CRT and the display screen. This is shown by the relationship $$OL = EFL(1 + 1/M) + EFL(1 + M)$$

where OL is the overall conjugate distance of the system from object to image

EFL (1+M) is the distance from the image to the first principal point of the lens EFL (1+1/M) is the distance from the object to the second principal point of the lens and M is the magnification of the system expressed as the ratio of object height to image height.

Therefore, in order to decrease the total distance between the CRT and the screen, it is necessary to reduce the EFL.

Projection lens of the overall type described have been designed with decreased EFL's by designing a more complex second lens unit split into more than one lens element as exemplified in the lenses disclosed in co-pending applications Ser. Nos. 642,825 and 652,062, filed Aug. 21, 1984 and Sept. 19, 1984, now U.S. Pat. Nos. 4,697,892 and 4,707,084, respectively.

These designs are currently used on many wide screen projection television sets and may have an equivalent focal length as low as eighty millimeters. It will be understood that the EFL will be greater if there is a fold in the optical axis between the first and second lens units.

The lenses described in the above identified patents as well as those disclosed in co-pending applications are limited in angular coverage by the fact that the light from the phosphorus on the internal surface of the cathode ray tube (CRT) face plate will be internally reflected at high angles of incidence. Therefore, in order to achieve a smaller volume cabinet for projection television systems, it is necessary to see the phosphors of the CRT face plate all at an angle no larger than the previously mentioned lenses. This requires a wider angle lens, without having a wider angle at the phosphor screen, which displays the image.

In lenses of the type disclosed in the previously mentioned patents, the conventional way to accomplish this is to use a retrofocus or inverted telephoto type of design. Generally stated, a retrofocus lens is one in which the back focal length (BFL) is greater than the equivalent focal length. Lenses of this type have a negative group on the object end followed by a positive group. In this construction a very wide angle of the object can be covered.

The lenses of the above identified patents and applications comprise from the object end a lens unit of relatively large negative power serving as a field flattener and correcting the Petzval curvature of the other lens elements. This strong negative group is followed by a second strong positive lens unit and then by a third lens unit having at least one aspheric surface to correct aberrations. In the above referenced patents and applications, the optical power of this third lens unit is relatively weak as determined by the radii and thickness at the optical axis.

The strong negative power of the field flattener introduces obliquity to the rays. The solution to this problem is to reduce the optical power of the field flattening lens unit. However, this would result in increased field curvature which must be corrected at another location with negative power. Thus it is necessary to introduce negative power at the aberration corrector lens unit. However, if the corrector lens unit has increased negative optical power in order to additionally correct for Petzval curvature, then it may introduce other aberrations which must be at least partially corrected by the second positive lens unit. The immediate effect of increased negative power in the corrector is that spherical aberration is considerably increased.

The aperture rays become larger at the positive lens unit than at the corrector lens unit. The aperture rays are the rays that strike the top and bottom of the exit pupil. They are the limiting rays that go diametrically through the top and bottom of the aperture (or the diametrically opposed horizontal limits of the aperture), sometimes referred to as the diaphragm. As a design consideration, it is not desired that the angles of these rays increase as they traverse the overall lens since the aberrations associated with these rays (aperture dependent aberrations) increase.

One technique of correcting for these aberrations is a more complex design of the middle positive lens unit. Thus, this requires at least two elements in the second lens unit. The aberration corrector lens unit must also have a complex problem of partially correcting field curvature without introducing excessive amounts of distortion and astigmatism.

Overall, this requires aspheric surfaces of high order polynomials on the aberration correcting lens unit, and the concave surface of the field flattener must be carefully configured in order that it not introduce aberrations that cannot be corrected.

The solution to the overall problem is that the aberration corrector lens unit has significant negative power in the coaxial determination thereof but even more power considering the aspherics. The field flattener lens unit has a base radius at the optical axis which is of a magnitude that woud indicate lesser negative optical power as calculated at the optical axis. Otherwise stated, the field flattener lens unit from a paraxial aberration point of view does not appear to do a function it is actually accomplishing with its aspheric surface. The field flattening lens unit must thus do more work off the optical axis than on the optical axis.

Therefore, to achieve the objects of this invention, the aspheric surfaces of the aberration corrector lens unit and the field flattener lens unit must be configured to achieve the desired aberration correction. It is difficult to describe these aspheric surfaces as such and therefore the surfaces and powers of the lens units having aspheric surfaces will be at least partially described in terms of "approximating or best fitting spheres" or in terms of optical power based on lens elements having "approximating or best fitting spherical surfaces".

Approximating or best fitting spherical surfaces with respect to aspheric surfaces are discussed in a paper entitled, "Minimax Approximation By A semi-Circle", by Charles B. Dunham and Charles R. Crawford, published in the Society For Industrial And Applied Mathematics Journal, Vol. 17, No. 1, February, 1980, the disclosure of which is incorporated herein by reference.

An algorithm prepared by one of the authors of the above referenced paper for defining the approximation of best fit of spherical surfaces with respect to from aspherical surfaces is hereinafter set forth.

SUMMARY OF THE INVENTION

Briefly stated, the invention in a preferred form thereof comprises from the image end a first lens unit convex to the image and concave to the object, it may take the overall form of a negative meniscus or it may consist of two elements of overall negative power; the second lens unit provides all of the positive power of the lens and consists of two positive elements and being generally overall biconvex, but including at least one biconvex element; the third lens unit has an aspheric surface concave to the image and in some cases may have an aspheric surface on the object side. Various surfaces of the elements of the lens groups may have aspheric surfaces for purposes of aberration correction of off-axis rays.

It is difficult to accurately express the optical powers of the various lens units by only considering the optical power of the lens units at the optical axis since the aspheric surfaces introduce optical power for aberration correction purposes which differs significantly if only considering spherical surfaces. Therefore, the various examples of lenses embodying the invention are also set forth in terms of surfaces which are defined as the best fitting spherical surfaces in relation to aspheric surfaces.

A primary object of this invention is to provide new and improved projection lenses for a wide screen television set which has a short EFL and contributes to the reduction of the volume of a projection type television cabinet.

The features of the invention which are believed to be novel are particularly pointed out and distinctly claimed in the concluding portion of the specification. The invention, however, together with further objects and advantages thereof, may best be appreciated by reference to the following detailed description taken in conjunction with the drawings.

DETAILED DESCRIPTION OF PREFERRED EMBODIMENTS OF THE INVENTION

Figure 1:
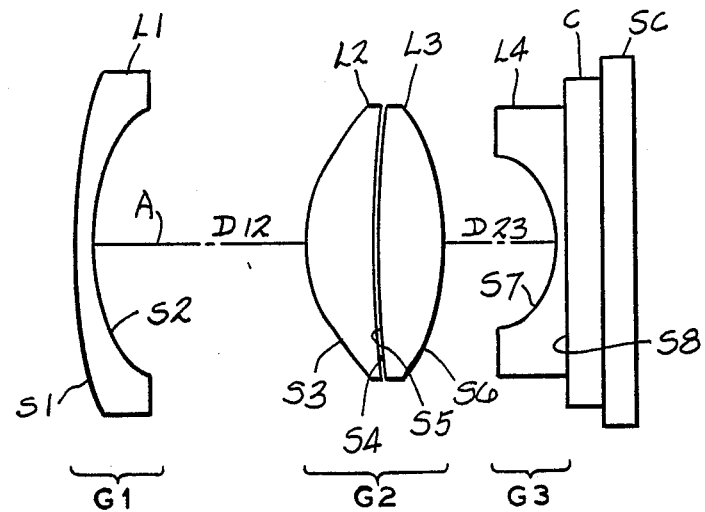
FIGS. 1-7 are diagrammatic side elevations of lenses embodying the invention.

Eight different projection lenses embodying the invention are set forth in Tables I-VIII and exemplified in the drawings. These lenses differ from those described in the aforementioned patents and applications in that there is substantial negative power in the first lens unit, as viewed from the image end. Besides providing negative power, the first lens unit also acts as an aberration corrector, as will be more fully discussed in conjunction with FIG. 4a.

In all disclosed embodiments of the invention, the first lens unit G1 is convex to the image and concave to the object. The first lens unit may consist of one or two elements. The first lens unit in its simplest form is an overall negative meniscus convex to the image.

The second lens unit G2 consists of two elements which are generally overall biconvex and may define a biconcave air gap therebetween. The second lens unit G2 has one or more aspheric surfaces.

The third lens unit G3 is defined concave to the image end with an aspheric surface. The third lens unit G3 serves as a field flattener but does not entirely correct the curvature of the other lens elements. The first lens unit makes some contribution to correction of curvature.

In the drawings, the lens elements are identified by the reference L followed by successive arabic numerals from the image to the object end. Surfaces of the lens elements are identified by the reference S followed by successive arabic numerals form the image to the object end. The reference SC denotes the screen of a cathode ray tube while the reference C denotes a liquid optical coupler between the screen SC and the overall lens.

In the Tables I-VIII, which are referred to as the primary prescriptions, each of the lenses is defined with respect to its actual prescription. Tables I-A to VIII-A, which may be referred to as secondary prescriptions, correspond to Tables I-VIII, respectively, but define the lenses with respect to the best approximating or best fitting spheres for each aspherical surface of Tables I-VIII.

Table IX sets forth the optical power of each lens unit $K_1$, $K_2$, $K_3$, of each lens to the overal power of the lens $K_0$, as the optical powers of the lens units are calculated from the radii of the elements of each lens unit at the optical axis as set forth in the primary prescriptions of Tables I-VIII. However, such powers may not in all cases be completely descriptive of the powers of the lens units since the aspheric surfaces are defined by the equation $$x = \frac{Cy^2}{1 + \sqrt{1 - (1+K)C^2y^2}} +$$

-continued $$Dy^4 + Ey^6 + Fy^8 + Gy^{10} + Hy^{12} + Iy^{14}$$

where x is the surface sag at a semi-aperture distance y from the axis A of the lens, C is the curvature of a lens surface at the optical axis A equal to the reciprocal of the radius of the optical axis, K is a conic constant.

The power of the lens units as determined by the radii at the optical axis may not be representative of the overall power contribution of the lens elements with aspheric surfaces.

Accordingly, in Tables I-A to VIII-A, the prescriptions of the lens are recast with the aspheric surfaces defined in terms of the best fitting spherical surface, as hereinafter explained.

The best fitting or approximating sphere for an aspheric surface may be defined by the sag x of the spherical surface with respect to the height y from the optical axis where the sphere passes through the end of the clear aperture of the lens surface and another point vertically spaced from the optical axis. This approximation will probably result in the vertex of the approximating sphere on the optical axis A being displaced from the vertex of the aspheric surface on the optical axis A by a distance V.

The term best fitting spherical surface is defined by a point at the extreme of the clear aperture of an aspheric lens surface and a point on the aspheric surface intermediate the extreme point of the clear aperture and the optical axis, where the vertex of a spherical curve through these two points is on the optical axis of both the aspheric surface and the best fitting spherical surface.

The aspheric equation has previously been set forth. Let the foregoing aspheric equation be defined by f and let CA/2 be the clear radius of a lens surface (one half the clear aperture of the surface).

Then $$x = f(y) \text{ for } 0 < y \leq CA/2$$

is the sag equation and y can be no greater than CA/2, and $$x = s(y) = V + \frac{cy^2}{1 + \sqrt{1 - c^2y^2}}$$

where s(y) is the sag equation for the circleand c is the curvature of the best fitting spherical surface. Choose initial values of c and V, where V is the axial departure of the vertex of the best fitting spherical surface from the vertex of the aspherical surface.

The spherical curvature c of the best fitting spherical surface is calculated in the following steps.

1. Initial values for c and V are:

$$c = 8N_1/N_3$$

$$V = (3y_2 + 4N_2/N_3 - 1)/c$$

where $$N_1 = f(y_2) - f(y_1)$$

$$N_2 = f(y_2)^2 - f(y_1)^2$$

$$N_3 = \sqrt{(9y_2^2 + 4N_1^2)(y_2^2 + 4N_1^2)}$$

-continued $$y_1 = CA/4$$

$$y_2 = CA/2$$

2. Calculate new values for $0 < y_1 < y_2 \leq CA/2$ as to the two non-zero solutions of the equation $$f'(y) = \sqrt{1 - c^2 y^2} = c^2 y$$

where f'(y) is the derivative of f(y) with respect to y, or $$f' = df(y)/dy.$$

3. Calculate new values for c and V as $$c = \frac{2f(y_2)}{y_2^2 + f(y_2)^2}$$

$$V = \frac{f(y_1)}{2} - \frac{cy_1^2}{2(1 + \sqrt{1 - c^2 y_1^2})}$$

4. Repeat steps (2) and (3) until there is no essential change in c to the fourth or fifth most significant digit.

The final value of the curvature is that of a circle with its center on the optical axis A which is closest to the sag curve as described in the above identified publication. The sag equation for the circle can be written as $$x = s(y) = V + \frac{cy^2}{1 + \sqrt{1 - C^2 y^2}}$$

This sag equation describes a rotationally symmetric surface with a vertex at the optical axis A.

Figure 8:
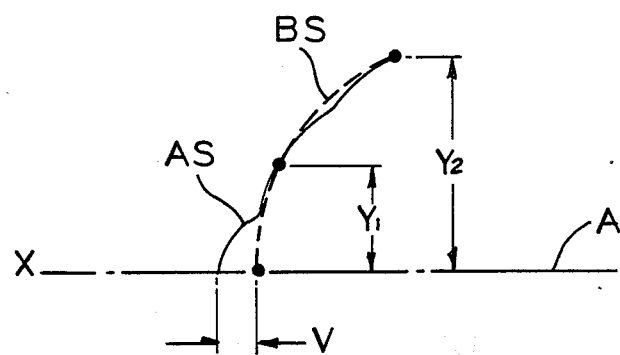
FIG. 8 is a diagrammatic view of an aspheric lens surface and also exemplifying the best fitting sphere therefor.

FIG. 8 exemplifies one-half of an aspherical surface AS and its best fitting spherical surface BS as determined by the foregoing equations. FIG. 8 is exaggerated for clarity of illustration.

In this manner the best fitting spherical surface for an aspheric surface may be determined. The distances V for the two surfaces of a lens element may then be determined and the thickness of the lens as well as the best fitting spheres of the surfaces may be utilized to determine the optical power of the lens element. The optical powers of the lens units of each disclosed lens as calculated on the basis of best fitting spherical surfaces is hereinafter set forth in Table X.

A lens embodying the invention as specified in Tables I–VIII has the following parameters $$0.4 > |K_1/K_0| > 0.15$$

$$1.3 > K_2/K_0 > 0.9$$

$$0.9 > |K_3/K_0| > 0.2$$

where optical powers of the lens units are calculated from the radii of the lens elements of the optical axis, and where $K_1$, $K_2$, and $K_3$ are such optical powers of lens units G1, G2, and G3 respectively, and $K_0$ is the overall optical power of the lens calculated on the same basis.

Lenses embodying the invention where the surfaces of the lens elements are expressed as best fitting spheres are set forth in Tables I-A–VIII-A having the following parameters $$1.5 > |K_1/K_0| > 0.2$$

$$4.0 > K_2/K_0 > 1.0$$

$$5.0 > |K_3/K_0| > 0.7$$

where $K_1$, $K_2$ and $K_3$ are the optical powers of lens units G1, G2 and G3 respectively where the aspheric surfaces are defined as best approximating spherical surfaces, and $K_0$ is the optical power of the overall lens calculated on the same basis.

A comparison of the values of $K_1$; $K_2$; and $K_3$ for lens having aspheric surfaces with the same powers of the lens units where the element surfaces are defined as best fitting spheres indicates that the power of an aspheric surface as calculated at the optical axis is not indicative of the overall optical contribution of the lens throughout its clear aperture.

Figure 5:
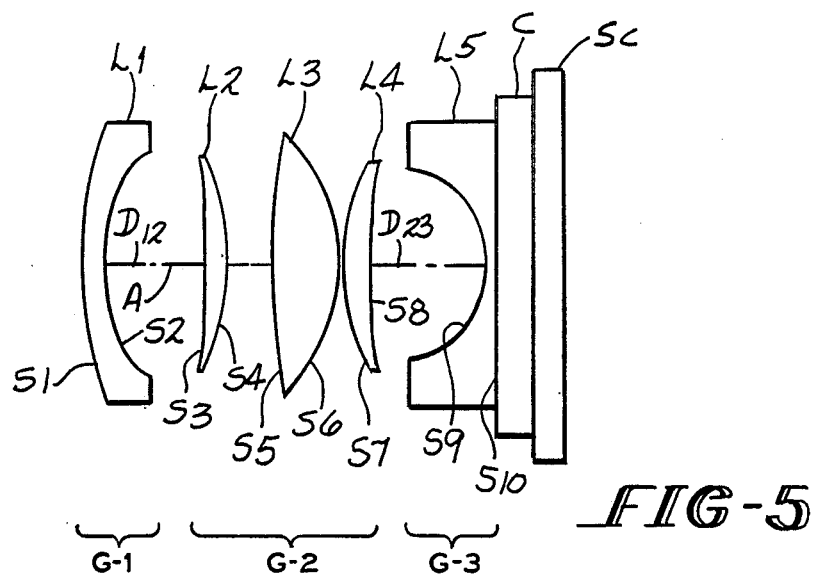

Note element L2, the lenses of FIG. 5 and Tables VII and VIII. There, the surface S3 is on a positive radius at the optical axis, but the overall surface is concave to the image end of the lens. Similarly, surface S8 of FIG. 5 is overall concave to the object end, but the radius at the optical axis A is negative.

Table I sets forth the prescription of a lens as shown in FIG. 1. Table I-A sets forth the lens of Table I where the elements surfaces are defined on spherical radii which are the best approximation to the aspherical surfaces of Table I.

Figure 6:
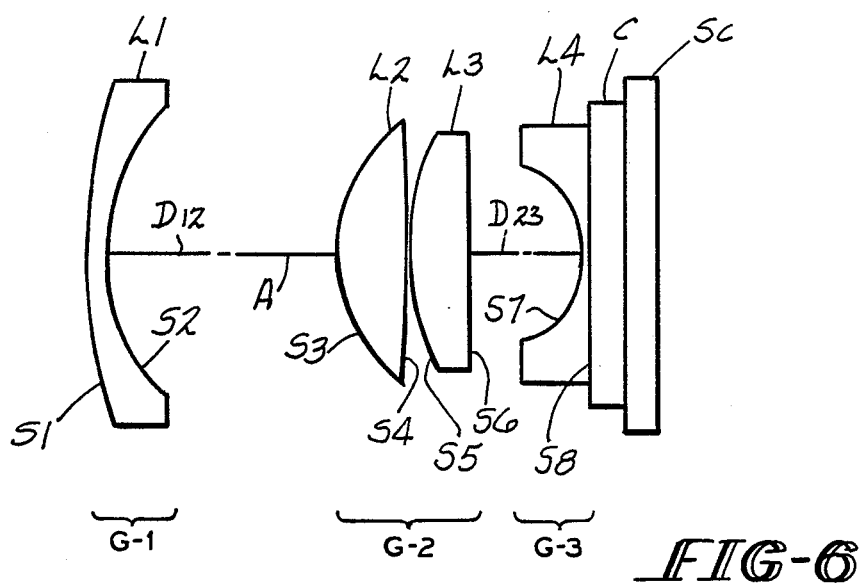

Table II sets forth the prescription of a lens as shown in FIG. 6. Table II-A sets forth the lens of Table II where the element surfaces are defined on spherical radii which are the best approximation to the aspherical surfaces of Table II.

Figure 2:
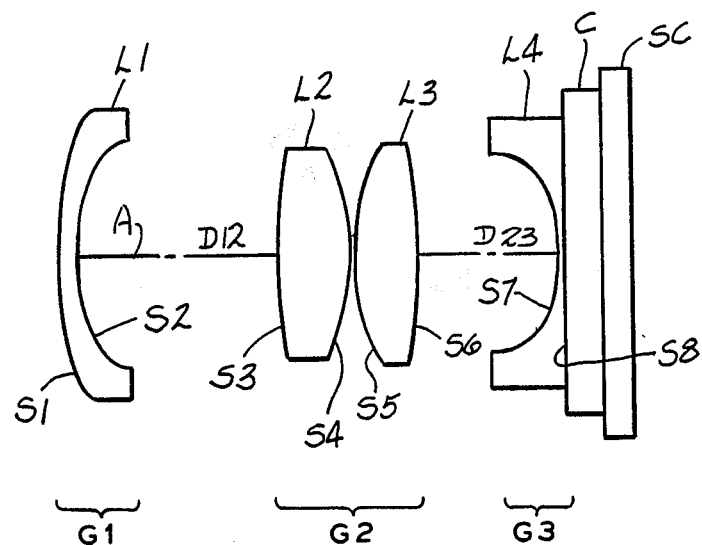

Table III sets forth a prescription of a lens as shown in FIG. 2. Table III-A sets forth the lens of Table III where the element surfaces are defined on spherical radii which are the best approximation to the aspheric surfaces of Table III.

Figure 4:
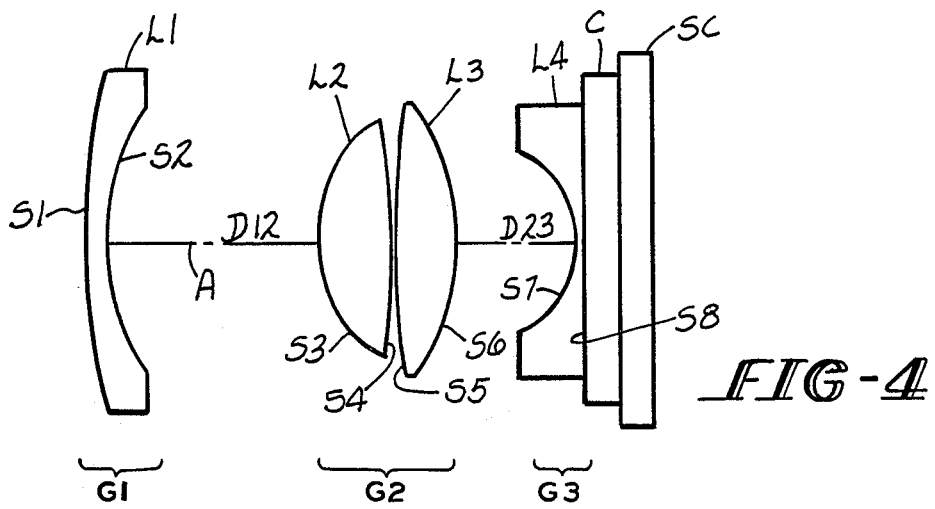

Table IV sets forth a prescription of a lens as shown in FIG. 4. Table IV-A sets forth the lens of Table IV where the element surfaces are defined on spherical radii which are the best approximation to the aspheric surfaces of Table IV.

Figure 7:
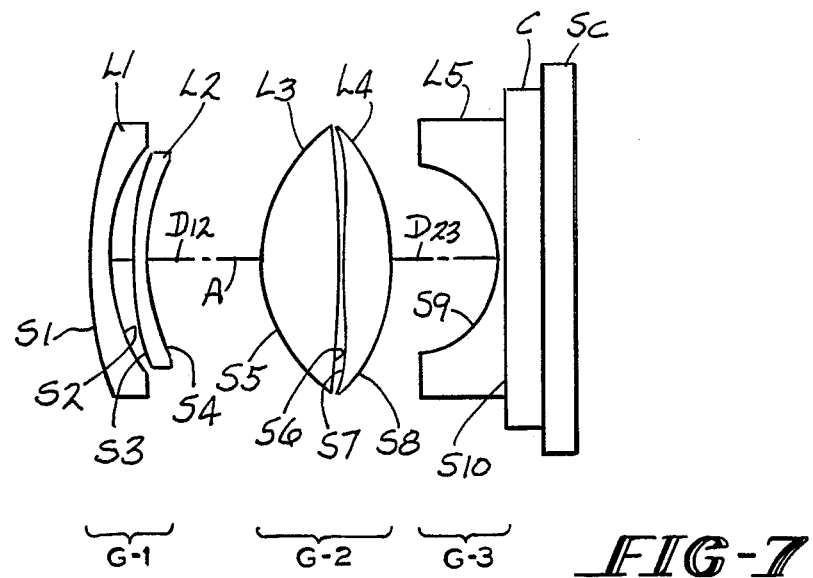

Table V sets forth the prescription of a lens as shown in FIG. 7. Table V-A sets forth the lens of Table V where the element surfaces are defined on spherical radii which are the best approximation to the aspheric surfaces of Table V.

Figure 3:
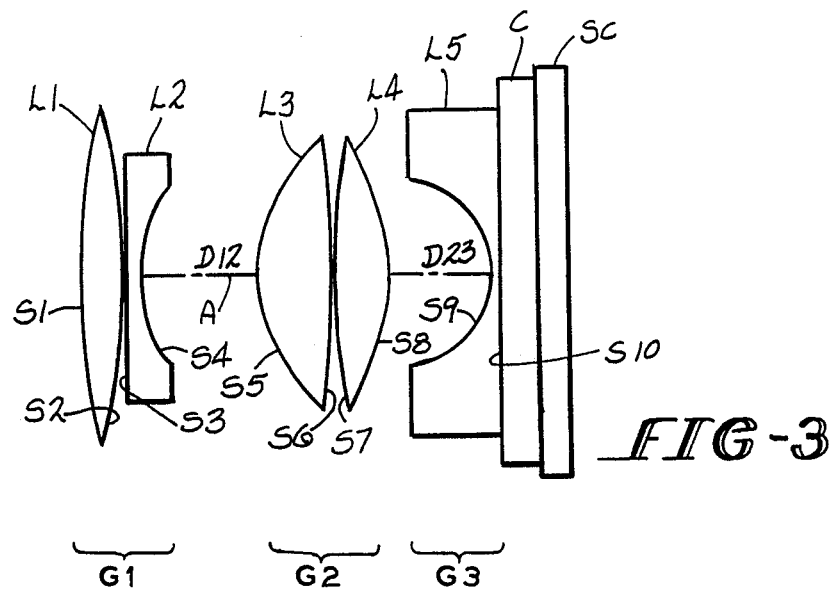

Table VI sets forth the prescription of a lens as shown in FIG. 3. Table VI-A sets forth the lens of Table VI where the element surfaces are defined on spherical radii which are the best approximation or fit to the aspheric surfaces of Table VI.

Table VII sets forth the prescription of another lens as shown in FIG. 5. Table VII-A sets forth the lens of Table VII where the element surfaces are defined on spherical radii which are the best approximation or fit to the aspheric surfaces of Table VII.

Table VIII sets forth the prescription of a lens as shown in FIG. 5. Table VIII-A sets forth the lens of Table VIII where the element surfaces are defined on spherical radii which are the best approximation or fit to the aspheric surfaces of Table VIII.

In Tables I-A to VIII-A, referred to as the secondary prescriptions, the best fitting spherical surfaces are set forth for each of the aspheric surfaces of primary Tables I–V together with the clear aperture CA of each surface. The clear aperture CA in each of the secondary prescriptions is the same as the clear aperture in the corresponding primary prescription. The clear aperture is defined as the opening in an optical system component that limits the extent of the bundle of rays incident thereon. The axial distances between surfaces are the same as in the primary tables as are the index of refraction and the Abbe number.

In the following tables the lens elements are identified from the image end to the object end by the reference L followed successively by an arabic numeral. Lens surfaces are identified by the reference S followed by an arabic numeral successively from the image to the object end. The index of refraction of each lens element is given under the heading $N_d$. The dispersion of each lens element as measured by its Abbe number is given by $V_d$. EFL is the equivalent focal length of the lens. IMD is the distance from the front vertex at the image end of the lens to the projection screen (not shown). F/No. is the relative aperture of the lens. The aspheric surfaces of the lens elements are in accordance with the coefficients set forth in the foregoing aspheric equation.

TABLE I

| LENS | | SURFACE RADII (mm) | AXIAL DISTANCE BETWEEN SURFACES (mm) | $N_d$ | $V_d$ |
|---|---|---|---|---|---|
| L1 | S1 | 216.550 | | | |
|    |    |         | 6.243 | 1.491 | 57.2 |
|    | S2 | 75.170  | | | |
|    |    |         | 71.758 | | |
| L2 | S3 | 45.740  | | | |
|    |    |         | 25.035 | 1.491 | 57.2 |
|    | S4 | −421.862 | | | |
|    |    |         | 0.239 | | |
| L3 | S5 | 293.042 | | | |
|    |    |         | 21.064 | 1.491 | 57.2 |
|    | S6 | −75.674 | | | |
|    |    |         | 40.198 | | |
| L4 | S7 | −43.319 | | | |
|    |    |         | 2.000 | 1.491 | 57.2 |
|    | S8 | Plano   | | | | f/No. = 1.13
EFL = 58.5 mm

Aspheric Surfaces S1, S2, S3, S4, S5, S6, S7

| | S1 | S2 | S3 | S4 |
|---|---|---|---|---|
| D | $0.1457 \times 10^{-6}$ | $0.5279 \times 10^{-6}$ | $0.2673 \times 10^{-6}$ | $0.8443 \times 10^{-6}$ |
| E | $-0.2538 \times 10^{-11}$ | $0.1122 \times 10^{-10}$ | $0.5103 \times 10^{-10}$ | $0.3302 \times 10^{-9}$ |
| F | $0.4302 \times 10^{-14}$ | $0.1713 \times 10^{-12}$ | $0.1719 \times 10^{-12}$ | $0.1383 \times 10^{-13}$ |
| G | $0.6243 \times 10^{-17}$ | $-0.3523 \times 10^{-16}$ | $-0.7333 \times 10^{-16}$ | $-0.9837 \times 10^{-16}$ |
| H | $0.1216 \times 10^{-20}$ | $-0.7186 \times 10^{-21}$ | $-0.1611 \times 10^{-19}$ | $-0.6026 \times 10^{-21}$ |
| I | $-0.5961 \times 10^{-24}$ | $0.1922 \times 10^{-22}$ | $-0.1231 \times 10^{-22}$ | $0.2859 \times 10^{-23}$ |
| K | | .01 | −1.00 | |

| | S5 | S6 | S7 |
|---|---|---|---|
| D | $-0.4808 \times 10^{-6}$ | $0.3266 \times 10^{-6}$ | $-0.9782 \times 10^{-5}$ |
| E | $-0.1189 \times 10^{-9}$ | $0.2250 \times 10^{-10}$ | $0.4308 \times 10^{-9}$ |
| F | $0.2669 \times 10^{-13}$ | $-0.2428 \times 10^{-13}$ | $-0.5173 \times 10^{-11}$ |
| G | $0.3719 \times 10^{-16}$ | $-0.5035 \times 10^{-17}$ | $0.7128 \times 10^{-14}$ |
| H | $0.5881 \times 10^{-20}$ | $-0.7435 \times 10^{-21}$ | $-0.2507 \times 10^{-17}$ |
| I | $-0.3622 \times 10^{-23}$ | $-0.1628 \times 10^{-23}$ | $-0.8975 \times 10^{-20}$ |
| K | .01 | | −1.00 |

TABLE I-A

| LENS | | SURFACE RADII (mm) | CLEAR APERTURE (mm) |
|---|---|---|---|
| L1 | S1 | 146.300 | 108.56 |
|    | S2 | 60.060  | 86.38 |
| L2 | S3 | 57.160  | 88.46 |
|    | S4 | 924.300 | 88.37 |
| L3 | S5 | 505.100 | 88.35 |
|    | S6 | −79.660 | 87.77 |
| L4 | S7 | −31.130 | 56.94 |
|    | S8 | Plano   | 83.62 |

TABLE II

| LENS | | SURFACE RADII (mm) | AXIAL DISTANCE BETWEEN SURFACES (mm) | $N_d$ | $V_d$ |
|---|---|---|---|---|---|
| L1 | S1 | 166.904 | | | |
|    |    |         | 6.243 | 1.491 | 57.2 |
|    | S2 | 75.237  | | | |
|    |    |         | 77.259 | | |
| L2 | S3 | 46.372  | | | |
|    |    |         | 25.035 | 1.491 | 57.2 |
|    | S4 | −595.864 | | | |
|    |    |         | 0.200 | | |
| L3 | S5 | 96.866  | | | |
|    |    |         | 21.064 | 1.491 | 57.2 |
|    | S6 | −210.113 | | | |

TABLE II-continued

| | | 37.481 | | |
|---|---|---|---|---|
| | S7 | −56.167 | | |
| L4 | | | 2.000 | 1.491 57.2 |
| | S8 | Plano | | | f/No. = 1.13
EFL = 59.3 mm

Aspheric Surfaces S1, S2, S3, S4, S5, S6, S7

| | S1 | S2 | S3 | S4 |
|---|---|---|---|---|
| D | $0.2052 \times 10^{-7}$ | $0.4766 \times 10^{-6}$ | $0.3950 \times 10^{-6}$ | $0.4004 \times 10^{-6}$ |
| E | $-0.4349 \times 10^{-10}$ | $-0.1859 \times 10^{-9}$ | $0.6432 \times 10^{-10}$ | $0.1123 \times 10^{-9}$ |
| F | $-0.1139 \times 10^{-13}$ | $0.1535 \times 10^{-12}$ | $0.1770 \times 10^{-12}$ | $-0.4412 \times 10^{-13}$ |
| G | $0.2233 \times 10^{-17}$ | $-0.2795 \times 10^{-16}$ | $-0.5371 \times 10^{-16}$ | $-0.1053 \times 10^{-15}$ |
| H | $0.8935 \times 10^{-21}$ | $-0.6048 \times 10^{-20}$ | $0.5561 \times 10^{-20}$ | $0.4884 \times 10^{-20}$ |
| I | $-0.1971 \times 10^{-24}$ | $0.4819 \times 10^{-23}$ | $0.1286 \times 10^{-23}$ | $0.9480 \times 10^{-23}$ |
| K | | .01 | −.10 | |

| | S5 | S6 | S7 |
|---|---|---|---|
| D | $0.2393 \times 10^{-6}$ | $0.1034 \times 10^{-5}$ | $-0.1547 \times 10^{-4}$ |
| E | $0.1915 \times 10^{-9}$ | $0.7964 \times 10^{-9}$ | $0.7389 \times 10^{-8}$ |
| F | $-0.2083 \times 10^{-13}$ | $0.1682 \times 10^{-12}$ | $-0.5424 \times 10^{-11}$ |
| G | $-0.9563 \times 10^{-16}$ | $-0.3099 \times 10^{-15}$ | $-0.1575 \times 10^{-14}$ |
| H | $-0.7131 \times 10^{-19}$ | $-0.2500 \times 10^{-18}$ | $-0.1023 \times 10^{-16}$ |
| I | $-0.3804 \times 10^{-22}$ | $0.1140 \times 10^{-21}$ | $0.6243 \times 10^{-20}$ |
| K | | | −.10 |

TABLE II-A

| LENS | | SURFACE RADII (mm) | CLEAR APERTURE (mm) |
|---|---|---|---|
| L1 | S1 | 189.000 | 110.68 |
| | S2 | 66.300 | 94.17 |
| | S3 | 51.400 | 86.76 |
| L2 | | | |
| | S4 | −655.000 | 86.65 |
| | S5 | 105.400 | 75.55 |
| L3 | | | |
| | S6 | −837.000 | 64.86 |
| | S7 | −31.400 | 55.60 |
| L4 | | | |
| | S8 | Plano | 79.30 |

TABLE III

| LENS | SURFACE RADII (mm) | AXIAL DISTANCE BETWEEN SURFACES (mm) | $N_d$ | $V_d$ |
|---|---|---|---|---|
| L1 | S1  246.760 | | | |
| | | 6.243 | 1.491 | 57.2 |
| | S2  92.505 | | | |
| | | 67.852 | | |
| L2 | S3  222.727 | | | |
| | | 25.035 | 1.491 | 57.2 |
| | S4  −61.535 | | | |
| | | 0.016 | | |
| | S5  79.276 | | | |
| L3 | | 21.064 | 1.491 | 57.2 |
| | S6  −1551.181 | | | |
| | | 47.784 | | |
| | S7  −134.500 | | | |
| L4 | | 2.000 | 1.491 | 57.2 |
| | S8  Plano | | | | f/No. = 1.30
EFL = 60.4 mm

Aspheric Surfaces S1, S2, S3, S4, S5, S6, S7

| | S1 | S2 | S3 | S4 |
|---|---|---|---|---|
| D | $0.3934 \times 10^{-6}$ | $0.1331 \times 10^{-5}$ | $-0.1406 \times 10^{-5}$ | $-0.1758 \times 10^{-6}$ |
| E | $0.1373 \times 10^{-9}$ | $0.5398 \times 10^{-9}$ | $-0.1483 \times 10^{-9}$ | $-0.7773 \times 10^{-10}$ |
| F | $0.1155 \times 10^{-12}$ | $0.2896 \times 10^{-12}$ | $0.2898 \times 10^{-12}$ | $0.1598 \times 10^{-12}$ |
| G | $0.3658 \times 10^{-16}$ | $-0.4713 \times 10^{-16}$ | $0.5695 \times 10^{-15}$ | $0.2485 \times 10^{-15}$ |
| H | $-0.1159 \times 10^{-20}$ | $0.1012 \times 10^{-18}$ | $0.4875 \times 10^{-18}$ | $0.1691 \times 10^{-18}$ |
| I | $-0.6584 \times 10^{-23}$ | $0.2241 \times 10^{-21}$ | $-0.3747 \times 10^{-21}$ | $0.6309 \times 10^{-22}$ |
| K | | .01 | | −1.00 |

| | S5 | S6 | S7 |
|---|---|---|---|
| D | $0.7760 \times 10^{-6}$ | $-0.4956 \times 10^{-6}$ | $-0.6589 \times 10^{-5}$ |
| E | $0.3204 \times 10^{-9}$ | $-0.4122 \times 10^{-9}$ | $-0.8723 \times 10^{-9}$ |
| F | $-0.1895 \times 10^{-12}$ | $-0.1718 \times 10^{-12}$ | $-0.7774 \times 10^{-11}$ |
| G | $-0.2684 \times 10^{-15}$ | $-0.6347 \times 10^{-15}$ | $0.5907 \times 10^{-14}$ |
| H | $-0.1408 \times 10^{-18}$ | $0.5225 \times 10^{-18}$ | $-0.1019 \times 10^{-17}$ |
| I | $0.1588 \times 10^{-21}$ | $-0.7378 \times 10^{-22}$ | $-0.3378 \times 10^{-20}$ |
| K | −1.00 | | −1.00 |

TABLE III-A

| LENS | | SURFACE RADII (mm) | CLEAR APERTURE (mm) |
|---|---|---|---|
| L1 | S1 | 94.490 | 94.05 |
|  | S2 | 52.150 | 74.57 |
|  | S3 | 260.600 | 67.02 |
| L2 | | | |
|  | S4 | −72.000 | 67.04 |
|  | S5 | 74.500 | 70.02 |
| L3 | | | |
|  | S6 | −176.800 | 70.11 |
|  | S7 | −38.970 | 61.69 |
| L4 | | | |
|  | S8 | Plano | 84.01 |

TABLE IV-A

| LENS | | SURFACE RADII (mm) | CLEAR APERTURE (mm) |
|---|---|---|---|
| L1 | S1 | 163.700 | 97.21 |
|  | S2 | 50.660 | 78.68 |
|  | S3 | 65.170 | 92.24 |
| L2 | | | |
|  | S4 | 6373.00 | 93.89 |
|  | S5 | 265.700 | 94.79 |
| L3 | | | |
|  | S6 | −80.160 | 94.83 |
|  | S7 | −31.410 | 58.04 |
| L4 | | | |
|  | S8 | −863.300 | 82.36 |

TABLE IV

| LENS | | SURFACE RADII (mm) | AXIAL DISTANCE BETWEEN SURFACES (mm) | $N_d$ | $V_d$ |
|---|---|---|---|---|---|
| L1 | S1 | 146.930 | | | |
|  |  |  | 66.243 | 1.491 | 57.2 |
|  | S2 | 56.741 | | | |
|  |  |  | 64.829 | | |
|  | S3 | 47.617 | | | |
| L2 |  |  | 25.035 | 1.492 | 57.2 |
|  | S4 | −624.122 | | | |
|  |  |  | 0.239 | | |
|  | S5 | 208.956 | | | |
| L3 |  |  | 21.064 | 1.491 | 57.2 |
|  | S6 | −70.140 | | | |
|  |  |  | 42.611 | | |
|  | S7 | −42.446 | | | |
| L4 |  |  | 2.000 | 1.491 | 57.2 |
|  | S8 | 779.240 | | | | f/No. = 1.16
EFL = 58.6 mm

Aspheric Surfaces S1, S2, S3, S4, S5, S6, S7, S8

| | S1 | S2 | S3 | S4 |
|---|---|---|---|---|
| D | $-0.1026 \times 10^{-6}$ | $0.3737 \times 10^{-6}$ | $0.2045 \times 10^{-6}$ | $0.7369 \times 10^{-6}$ |
| E | $-0.9636 \times 10^{-10}$ | $-0.1449 \times 10^{-9}$ | $-0.1423 \times 10^{-9}$ | $0.5642 \times 10^{-10}$ |
| F | $0.5512 \times 10^{-14}$ | $0.3349 \times 10^{-12}$ | $0.9892 \times 10^{-13}$ | $0.9767 \times 10^{-14}$ |
| G | $0.1553 \times 10^{-16}$ | $-0.8879 \times 10^{-16}$ | $-0.6524 \times 10^{-16}$ | $-0.8640 \times 10^{-16}$ |
| H | $0.2891 \times 10^{-20}$ | $-0.2552 \times 10^{-19}$ | $-0.3702 \times 10^{-20}$ | $0.2879 \times 10^{-20}$ |
| I | $-0.2098 \times 10^{-23}$ | $0.8072 \times 10^{-22}$ | $-0.8153 \times 10^{-23}$ | $0.2691 \times 10^{-23}$ |
| K | | .01 | −1.00 | .02 |

| | S5 | S6 | S7 | S8 |
|---|---|---|---|---|
| D | $-0.4905 \times 10^{-6}$ | $0.6019 \times 10^{-6}$ | $-0.1063 \times 10^{-4}$ | $-0.1784 \times 10^{-5}$ |
| E | $0.7089 \times 10^{-10}$ | $0.1516 \times 10^{-9}$ | $-0.1062 \times 10^{-8}$ | $0.7768 \times 10^{-9}$ |
| F | $0.1758 \times 10^{-13}$ | $-0.4171 \times 10^{-13}$ | $-0.4329 \times 10^{-11}$ | $-0.1799 \times 10^{-13}$ |
| G | $0.2095 \times 10^{-16}$ | $-0.7276 \times 10^{-17}$ | $0.9379 \times 10^{-14}$ | $-0.3822 \times 10^{-16}$ |
| H | $0.5110 \times 10^{-21}$ | $-0.7367 \times 10^{-22}$ | $-0.2215 \times 10^{-17}$ | $-0.2425 \times 10^{-20}$ |
| I | $-0.4245 \times 10^{-23}$ | $-0.2058 \times 10^{-23}$ | $-0.7526 \times 10^{-20}$ | $0.2987 \times 10^{-24}$ |
| K | .01 | | −1.00 | |

TABLE V

| LENS | | SURFACE RADII (mm) | AXIAL DISTANCE BETWEEN SURFACES (mm) | $N_d$ | $V_d$ |
|---|---|---|---|---|---|
| L1 | S1 | 167.615 | | | |
|  |  |  | 6.243 | 1.491 | 57.2 |
|  | S2 | 61.571 | | | |
|  |  |  | 8.017 | | |
|  | S3 | 169.241 | | | |
| L2 |  |  | 6.000 | 1.491 | 57.2 |
|  | S4 | 313.028 | | | |
|  |  |  | 36.937 | | |
|  | S5 | 47.382 | | | |
| L3 |  |  | 26.000 | 1.491 | 57.2 |
|  | S6 | −258.912 | | | |
|  |  |  | 1.800 | | |
|  | S7 | 219.059 | | | |
| L4 |  |  | 15.600 | 1.491 | 57.2 |
|  | S8 | −66.734 | | | |
|  |  |  | 36.124 | | |
|  | S9 | −37.402 | | | |
| L5 |  |  | 2.000 | 1.491 | 57.2 |

TABLE V-continued

| | | | |
|---|---|---|---|
| S10 | Plano | | | f/No. = 1.16
EFL = 59.3 mm

Aspheric Surfaces S1, S2, S3, S4, S5, S6, S7, S8, S9

| | S1 | S2 | S3 | S4 |
|---|---|---|---|---|
| D | $-0.4387 \times 10^{-6}$ | $-0.4902 \times 10^{-6}$ | $0.2103 \times 10^{-5}$ | $0.3272 \times 10^{-5}$ |
| E | $0.3231 \times 10^{-9}$ | $-0.6739 \times 10^{-9}$ | $0.1924 \times 10^{-9}$ | $0.1223 \times 10^{-8}$ |
| F | $0.1228 \times 10^{-13}$ | $0.6822 \times 10^{-12}$ | $0.3720 \times 10^{-13}$ | $0.2758 \times 10^{-12}$ |
| G | $0.2045 \times 10^{-16}$ | $-0.6941 \times 10^{-16}$ | $0.4164 \times 10^{-17}$ | $-0.2176 \times 10^{-15}$ |
| H | $0.3842 \times 10^{-20}$ | $-0.9358 \times 10^{-20}$ | $-0.7504 \times 10^{-19}$ | $-0.5323 \times 10^{-19}$ |
| I | $-0.2393 \times 10^{-24}$ | $0.1125 \times 10^{-21}$ | $-0.7800 \times 10^{-22}$ | $-0.2357 \times 10^{-21}$ |
| K | | .01 | $-.10$ | $-.10$ |

| | S5 | S6 | S7 |
|---|---|---|---|
| D | $0.5561 \times 10^{-6}$ | $0.1745 \times 10^{-6}$ | $-0.1424 \times 10^{-5}$ |
| E | $0.1013 \times 10^{-10}$ | $0.4263 \times 10^{-9}$ | $-0.4088 \times 10^{-9}$ |
| F | $0.1210 \times 10^{-12}$ | $-0.8047 \times 10^{-13}$ | $-0.3770 \times 10^{-13}$ |
| G | $-0.8672 \times 10^{-16}$ | $-0.8637 \times 10^{-16}$ | $0.1447 \times 10^{-16}$ |
| H | $0.2010 \times 10^{-20}$ | $0.1253 \times 10^{-19}$ | $-0.3821 \times 10^{-20}$ |
| I | $0.6581 \times 10^{-23}$ | $0.7957 \times 10^{-23}$ | $-0.6405 \times 10^{-23}$ |
| K | $-1.00$ | .01 | .01 |

| | S8 | S9 |
|---|---|---|
| D | $0.1481 \times 10^{-6}$ | $-0.1133 \times 10^{-4}$ |
| E | $0.8845 \times 10^{-10}$ | $0.1062 \times 10^{-7}$ |
| F | $-0.3592 \times 10^{-13}$ | $-0.2544 \times 10^{-10}$ |
| G | $0.9401 \times 10^{-18}$ | $0.1775 \times 10^{-13}$ |
| H | $-0.1344 \times 10^{-20}$ | $0.8784 \times 10^{-17}$ |
| I | $-0.4806 \times 10^{-23}$ | $-0.1615 \times 10^{-19}$ |
| K | | $-1.00$ |

TABLE V-A

| LENS | SURFACE | RADII (mm) | CLEAR APERTURE (mm) |
|---|---|---|---|
| L1 | S1 | 131.300 | 88.70 |
|  | S2 | 61.110 | 72.48 |
| L2 | S3 | 94.740 | 69.03 |
|  | S4 | 80.330 | 62.81 |
| L3 | S5 | 53.910 | 87.61 |
|  | S6 | $-467.500$ | 87.00 |
| L4 | S7 | $-287.500$ | 86.66 |
|  | S8 | $-67.420$ | 86.95 |
| L5 | S9 | $-31.080$ | 58.72 |
|  | S10 | Plano | 86.39 |

TABLE VI

| LENS | SURFACE | RADII (mm) | AXIAL DISTANCE BETWEEN SURFACES (mm) | $N_d$ | $V_d$ |
|---|---|---|---|---|---|
| L1 | S1 | 642.408 | | | |
|  | S2 | $-139.861$ | 12.755 | 1.491 | 57.2 |
|  |  |  | 0.100 | | |
| L2 | S3 | 1192.621 | | | |
|  | S4 | 52.068 | 6.243 | 1.491 | 57.2 |
|  |  |  | 38.772 | | |
| L3 | S5 | 47.349 | | | |
|  | S6 | $-244.468$ | 24.540 | 1.491 | 57.2 |
|  |  |  | 0.239 | | |
| L4 | S7 | 137.310 | | | |
|  | S8 | $-66.802$ | 19.205 | 1.491 | 57.2 |
|  |  |  | 34.690 | | |
| L5 | S9 | $-33.870$ | | | |
|  | S10 | Plano | 2.000 | 1.491 | 57.2 | f/No. = 1.16
EFL = 59.1 mm

Aspheric Surfaces S1, S2, S3, S4, S5, S6, S7, S8, S9

| | S1 | S2 | S3 |
|---|---|---|---|
| D | $0.7981 \times 10^{-07}$ | $0.2238 \times 10^{-6}$ | $-0.6941 \times 10^{-6}$ |
| E | $0.1890 \times 10^{-10}$ | $0.1252 \times 10^{-10}$ | $-0.9361 \times 10^{-10}$ |
| F | $0.1219 \times 10^{-13}$ | $0.2159 \times 10^{-14}$ | $0.4423 \times 10^{-13}$ |
| G | $0.2274 \times 10^{-17}$ | $0.1998 \times 10^{-17}$ | $0.2426 \times 10^{-16}$ |
| H | $0.2370 \times 10^{-21}$ | $0.5325 \times 10^{-21}$ | $0.6120 \times 10^{-21}$ |
| I | $0.1182 \times 10^{-24}$ | $-0.2579 \times 10^{-24}$ | $-0.4893 \times 10^{-23}$ |
| K | $-5.00$ | | |

| | S4 | S5 | S6 |
|---|---|---|---|
| D | $0.3545 \times 10^{-6}$ | $0.6922 \times 10^{-6}$ | $0.6657 \times 10^{-6}$ |
| E | $0.2113 \times 10^{-9}$ | $-0.4598 \times 10^{-10}$ | $0.4229 \times 10^{-9}$ |
| F | $0.3290 \times 10^{-14}$ | $0.9031 \times 10^{-13}$ | $-0.4867 \times 10^{-13}$ |
| G | $-0.1981 \times 10^{-15}$ | $-0.8441 \times 10^{-16}$ | $-0.1235 \times 10^{-15}$ |
| H | $0.1905 \times 10^{-18}$ | $-0.3861 \times 10^{-20}$ | $0.1870 \times 10^{-20}$ |
| I | $0.3420 \times 10^{-21}$ | $-0.3893 \times 10^{-23}$ | $0.9654 \times 10^{-23}$ |
| K | .01 | $-1.00$ | .01 |

| | S7 | S8 | S9 |
|---|---|---|---|
| D | $-0.8942 \times 10^{-6}$ | $0.1801 \times 10^{-6}$ | $-0.9686 \times 10^{-5}$ |
| E | $-0.3251 \times 10^{-9}$ | $0.3124 \times 10^{-9}$ | $0.2100 \times 10^{-8}$ |
| F | $0.8248 \times 10^{-13}$ | $0.1344 \times 10^{-13}$ | $-0.1940 \times 10^{-10}$ |
| G | $0.6633 \times 10^{-16}$ | $0.1830 \times 10^{-17}$ | $0.1882 \times 10^{-13}$ |
| H | $0.1286 \times 10^{-19}$ | $0.1112 \times 10^{-20}$ | $0.1225 \times 10^{-16}$ |
| I | $-0.2432 \times 10^{-23}$ | $-0.1887 \times 10^{-23}$ | $-0.2295 \times 10^{-19}$ |
| K | .01 | | $-1.00$ |

TABLE VI-A

| LENS | SURFACE | RADII (mm) | CLEAR APERTURE (mm) |
|---|---|---|---|
| L1 | S1 | 324.000 | 103.42 |
|  | S2 | $-206.200$ | 100.27 |
| L2 | S3 | $-858.200$ | 76.14 |
|  | S4 | 49.900 | 57.87 |
|  | S5 | 56.690 | 88.44 |

TABLE VI-A-continued

| LENS | | SURFACE RADII (mm) | CLEAR APERTURE (mm) |
|---|---|---|---|
| L3 | | | |
| | S6 | −705.200 | 88.38 |
| | S7 | 216.900 | 87.51 |
| L4 | | | |
| | S8 | −78.130 | 87.11 |
| | S9 | −29.560 | 56.96 |
| L5 | | | |
| | S10 | Plano | 85.35 |

TABLE VII

| LENS | | SURFACE RADII (mm) | AXIAL DISTANCE BETWEEN SURFACES (mm) | $N_d$ | $V_d$ |
|---|---|---|---|---|---|
| L1 | S1 | 127.389 | | | |
| | | | 6.243 | 1.491 | 57.2 |
| | S2 | 56.948 | | | |
| | | | 34.042 | | |
| L2 | S3 | 224.180 | | | |
| | | | 7.000 | 1.491 | 57.2 |
| | S4 | −106.944 | | | |
| | | | 17.452 | | |
| L3 | S5 | 429.048 | | | |
| | | | 21.500 | 1.491 | 57.2 |
| | S6 | −59.651 | | | |
| | | | 0.217 | | |
| L4 | S7 | 103.738 | | | |
| | | | 10.992 | 1.491 | 57.2 |
| | S8 | −798.572 | | | |
| | | | 39.230 | | |
| L5 | S9 | −49.054 | | | |
| | | | 2.000 | 1.491 | 57.2 |
| | S10 | Plano | | | | f/No. = 1.16
EFL = 59.9 mm

Aspheric Surfaces S1, S2, S3, S4, S5, S7, S8, S9

| | S1 | S2 | S3 | S4 |
|---|---|---|---|---|
| D | $-0.6256 \times 10^{-6}$ | $-0.1008 \times 10^{-6}$ | $-0.2997 \times 10^{-5}$ | $-0.1214 \times 10^{-5}$ |
| E | $0.5850 \times 10^{-9}$ | $0.3756 \times 10^{-9}$ | $-0.1534 \times 10^{-8}$ | $-0.2125 \times 10^{-9}$ |
| F | $-0.7773 \times 10^{-13}$ | $0.7565 \times 10^{-12}$ | $0.9141 \times 10^{-12}$ | $0.1425 \times 10^{-12}$ |
| G | $-0.1671 \times 10^{-16}$ | $-0.2120 \times 10^{-16}$ | $0.9078 \times 10^{-15}$ | $0.9688 \times 10^{-15}$ |
| H | $-0.2267 \times 10^{-20}$ | $-0.2762 \times 10^{-18}$ | $0.3723 \times 10^{-18}$ | $0.2489 \times 10^{-18}$ |
| I | $0.2325 \times 10^{-23}$ | $0.1459 \times 10^{-21}$ | $-0.6479 \times 10^{-21}$ | $-0.4171 \times 10^{-21}$ |
| K | | .01 | −.10 | −.10 |

| | S5 | S7 | S8 | S9 |
|---|---|---|---|---|
| D | $0.3188 \times 10^{-7}$ | $0.1588 \times 10^{-5}$ | $0.1361 \times 10^{-5}$ | $-0.9237 \times 10^{-5}$ |
| E | $-0.8748 \times 10^{-11}$ | $0.1207 \times 10^{-8}$ | $0.3639 \times 10^{-9}$ | $0.7308 \times 10^{-8}$ |
| F | $0.1001 \times 10^{-14}$ | $0.6269 \times 10^{-13}$ | $0.6304 \times 10^{-12}$ | $-0.2337 \times 10^{-10}$ |
| G | $0.8191 \times 10^{-17}$ | $0.1102 \times 10^{-15}$ | $0.2434 \times 10^{-15}$ | $0.1918 \times 10^{-13}$ |
| H | $0.2566 \times 10^{-20}$ | $0.3738 \times 10^{-18}$ | $0.5628 \times 10^{-19}$ | $0.1947 \times 10^{-17}$ |
| I | $-0.2504 \times 10^{-23}$ | $-0.1257 \times 10^{-21}$ | $-0.2897 \times 10^{-21}$ | $-0.9905 \times 10^{-20}$ |
| K | | | .01 | −1.0 |

TABLE VII-A

| LENS | | SURFACE RADII (mm) | CLEAR APERTURE (mm) |
|---|---|---|---|
| | S1 | 119.90 | 89.17 |
| L1 | | | |
| | S2 | 50.220 | 72.51 |
| | S3 | −507.400 | 67.53 |
| L2 | | | |
| | S4 | −112.400 | 68.68 |
| | S5 | 398.600 | 83.11 |
| L3 | | | |
| | S6 | −59.651 | 83.74 |
| | S7 | 61.500 | 66.56 |
| L4 | | | |
| | S8 | −181.700 | 63.30 |
| | S9 | −32.730 | 62.00 |
| L5 | | | |
| | S10 | Plano | 89.00 |

TABLE VIII

| LENS | | SURFACE RADII (mm) | AXIAL DISANCE BETWEEN SURFACES (mm) | $N_d$ | $V_d$ |
|---|---|---|---|---|---|
| L1 | S1 | 127.931 | | | |
| | | | 6.300 | 1.491 | 57.2 |
| | S2 | 57.092 | | | |
| | | | 34.090 | | |
| L2 | S3 | 222.500 | | | |
| | | | 7.600 | 1.491 | 57.2 |
| | S4 | −106.510 | | | |
| | | | 18.447 | | |
| L3 | S5 | 475.181 | | | |
| | | | 19.797 | 1.517 | 64.2 |
| | S6 | −61.926 | | | |
| | | | 0.260 | | |

TABLE VIII-continued

| | | | | | |
|---|---|---|---|---|---|
| L4 | S7 | 104.647 | | | |
| | | | 11.000 | 1.491 | 57.2 |
| | S8 | −922.486 | | | |
| | | | 39.155 | | |
| L5 | S9 | −49.326 | | | |
| | | | 2.000 | 1.491 | 57.2 |
| | S10 | Plano | | | | f/No. = 1.16
EFL = 59.9 mm

Aspheric Surfaces S1, S2, S3, S4, S7, S8, S9

| | S1 | S2 | S3 | S4 |
|---|---|---|---|---|
| D | $-0.6610 \times 10^{-6}$ | $-0.2060 \times 10^{-6}$ | $-0.3027 \times 10^{-5}$ | $-0.1253 \times 10^{-5}$ |
| E | $-0.6142 \times 10^{-9}$ | $0.4789 \times 10^{-9}$ | $-0.1450 \times 10^{-8}$ | $-0.1931 \times 10^{-9}$ |
| F | $-0.6622 \times 10^{-13}$ | $0.7782 \times 10^{-12}$ | $0.9528 \times 10^{-12}$ | $0.1797 \times 10^{-12}$ |
| G | $-0.1393 \times 10^{-16}$ | $-0.3658 \times 10^{-16}$ | $0.9204 \times 10^{-15}$ | $0.9855 \times 10^{-15}$ |
| H | $-0.2430 \times 10^{-20}$ | $-0.2609 \times 10^{-18}$ | $0.3834 \times 10^{-18}$ | $0.2385 \times 10^{-18}$ |
| I | $0.1563 \times 10^{-23}$ | $0.1876 \times 10^{-21}$ | $-0.6338 \times 10^{-21}$ | $-0.4361 \times 10^{-21}$ |
| K | | .01 | −.10 | −.10 |

| | S7 | S8 | S9 |
|---|---|---|---|
| D | $0.1513 \times 10^{-5}$ | $0.1170 \times 10^{-5}$ | $-0.9168 \times 10^{-5}$ |
| E | $0.1125 \times 10^{-8}$ | $0.3626 \times 10^{-9}$ | $0.7186 \times 10^{-8}$ |
| F | $0.4918 \times 10^{-13}$ | $0.5665 \times 10^{-12}$ | $-0.2363 \times 10^{-10}$ |
| G | $0.1133 \times 10^{-15}$ | $0.1747 \times 10^{-15}$ | $0.1905 \times 10^{-13}$ |
| H | $0.3723 \times 10^{-18}$ | $0.5614 \times 10^{-19}$ | $0.2074 \times 10^{-17}$ |
| I | $-0.1457 \times 10^{-21}$ | $-0.2520 \times 10^{-21}$ | $-0.9613 \times 10^{-20}$ |
| K | | .01 | −1.0 |

TABLE VIII-A

| LENS | | SURFACE RADII (mm) | CLEAR APERTURE (mm) |
|---|---|---|---|
| L1 | S1 | 116.800 | 89.83 |
| | S2 | 49.370 | 72.58 |
| L2 | S3 | −647.000 | 67.79 |
| | S4 | −110.200 | 68.99 |
| L3 | S5 | 475.181 | 82.04 |
| | S6 | −61.926 | 82.62 |
| L4 | S7 | 62.770 | 66.94 |
| | S8 | 206.700 | 63.50 |
| L5 | S9 | −32.750 | 61.00 |
| | S10 | Plano | 88.00 |

It will be noted that the axial spacing of the two elements of lens unit G2 is quite small, less than one percent of the equivalent focal length of the lens and these surfaces generally define a biconcave air gap at the optical axis.

Table IX sets forth the ratio of the power for each of the lens units of each lens of Tables I–VIII to the power of the overall lens, where the powers are based on surface radii of the elements at the optical axis.

In all cases, all elements of lens unit G2 are positive and at least one of the facing surfaces is aspheric where G2 is two elements. In FIG. 5 (Table VII) surface S7 is aspheric while surface S6 is spherical.

In all lenses except that of FIG. 5, the second lens unit G2 is overall biconvex. In all examples, the radius of the facing surface of the two elements of lens unit G2 are essentially equal to or greater than the equivalent focal length of the lens. The shapes of the elements of lens unit G2 may vary as shown. In some embodiments, lens unit G1 may comprise two elements as shown in FIG. 3 (Table VII) and FIG. 7 (Table VIII). In both of these instances, the overall power of G1 is negative, the image side surface is convex and the object side surface is concave.

Table IX sets forth the ratio of the power for each of the lens units of each lens of Tables I–VIII to the power of the overall lens, where the powers are based on surface radii of the elements at the optical axis.

TABLE IX

| TABLE | $K_1/K_0$ | $K_2/K_0$ | $K_3/K_0$ | $K_0$ |
|---|---|---|---|---|
| I | −.246 | 1.01 | −.666 | .0171 |
| II | −.208 | 1.00 | −.519 | .0169 |
| III | −.199 | .980 | −.222 | .0165 |
| IV | −.306 | 1.020 | −.721 | .0171 |
| V | −.295 | 1.10 | −.782 | .0169 |
| VI | −.253 | 1.17 | −.861 | .0169 |
| VII | −.277 | 1.169 | −.603 | .0169 |
| VIII | −.279 | 1.08 | −.600 | .0167 |

Table X sets forth the ratio of the power for each of the lens units of each of the lenses of Tables I-A to VIII-A to the power of the overall lens, where the powers are based on the surfaces of the best fitting spheres to each aspheric surface.

TABLE X

| TABLE | $K_1/K_0$ | $K_2/K_0$ | $K_3/K_0$ | $K_0$ |
|---|---|---|---|---|
| I | −.773 | 2.443 | −2.862 | .0055 |
| II | −.547 | 1.671 | 1.809 | .0087 |
| III | −.254 | 1.045 | −.776 | .0163 |
| IV | −.547 | 1.671 | −1.808 | .0044 |
| V | −1.397 | 3.822 | −4.339 | .0037 |
| VI | −1.229 | 3.066 | −3.254 | .0051 |
| VII | −.500 | 1.523 | −1.360 | .0111 |
| VIII | −.477 | 1.466 | −1.286 | .0117 |

Table XI sets forth the axial spacing D12 between lens units G1 and G2, and D23 between lens units G2 and G3, as a percent of the equivalent focal length of each of the lenses of Tables I–VIII as well as the semi-field angle of each of the lenses.

TABLE XI

| | | Semi-Field Angle |
|---|---|---|
| TABLE | $D_{23}$/EFL | $D_{23}$/EFL |
| I | 1.225 | .672 |
| II | 1.303 | .615 |

TABLE XI-continued

| TABLE | Semi-Field Angle | |
|---|---|---|
| | $D_{23}/EFL$ | $D_{23}/EFL$ |
| III | 1.123 | .791 |
| IV | 1.106 | .729 |
| V | .623 | .610 |
| VI | .656 | .587 |
| VII | .567 | .654 |
| VIII | .568 | .652 |

In all examples, the radii of the facing surfaces of the two elements of lens unit G2 are essentially equal to or greater than the equivalent focal length of the lens.

The invention provides projection lens of decreased equivalent focal length with very good aberration correction.

It may thus be seen that the objects of the invention set forth, as well as those made apparent from the foregoing description, are efficiently attained. While preferred embodiments of the invention have been set forth for purposes of disclosure, modifications to the disclosed embodiments of the invention, as well as other embodiments thereof, may occur to those skilled in the art. Accordingly, the appended claims are intended to cover all embodiments of the invention and modifications to the disclosed embodiments which do not depart from the spirit and scope of the invention.

Having thus described the invention, what is claimed is:

1. A projection lens comprising from the image end a negative lens unit having at least one aspheric surface, a positive lens unit, and a negative lens unit having an aspheric surface concave to the image, said first lens unit serving as an aberration corrector and contributing negative optical power to the overall lens, said third lens unit contributing to field flattening, said first lens unit also contributing to field flattening, and $$0.4 > |K_1/K_0| > 0.15$$

$$0.9 > |K_3/K_0| > 0.2$$

where $K_1$ and $K_3$ are the optical powers of said first and third lens units at the optical axis and $K_0$ is the optical power of the overall lens, determined at the optical axis.

2. The lens of claim 1 where said first lens unit has a convex image side surface and a concave object side surface.

3. The lens of claim 2 where said first lens unit consists of an overall meniscus shaped lens.

4. The lens of claim 2 where said first lens unit comprises at least two elements.

5. The lens of claim 2 where $$1.3 > K_2/K_0 > 0.9$$

where $K_2$ is the optical power of said second lens unit as calculated from radii at the optical axis of said lens.

6. The lens of claim 1 where said second lens unit is overall biconvex.

7. The lens of claim 1 where said second lens unit consists of at least two lens elements and at least one is biconvex.

8. The lens of claim 1 where said second lens unit consists of two biconvex elements.

9. The lens of claim 1 where said second lens unit has elements with aspheric facing surfaces which are axially spaced no more than one percent of the equivalent focal length of said lens.

10. The lens of claim 1 where the axial spacing $D_{12}$ of said first lens unit from said second lens unit and the axial spacing of said second lens unit from said third lens unit $D_{23}$ are $$1.4 > D_{12}/EFL > 0.5$$

$$0.9 > D_{23}/EFL > 0.5$$

where EFL is the equivalent focal length of the lens.

11. The lens of claim 1 where the axial spacing between said first and second lens units is between 0.5 and 1.4 of the equivalent focal length of the lens.

12. The lens of claim 1 where the axial spacing between said second and third lens units is between 0.5 and 0.8 of the equivalent focal length of the lens.

13. A lens according to claim 1 having aspheric surfaces defined by the equation $$X = \frac{C^2 v}{1 + \sqrt{1 - (1 + K)C^2 y^2}} + DY^4 + EY^6 + FY^8 + GY^{10} + HY^{12} + IY^{14}$$

where X is the surface sag at a semi-aperture distance Y from the axis A of the lens; C is the curvature of the lens surface at the optical axis A, equal to the reciprocal of the radius at the optical axis; and K is a conic constant.

14. A lens according to claim 13, as scaled to an object diagonal of approximately five inches, defined substantially as follows:

| LENS | SURFACE | RADII (mm) | AXIAL DISTANCE BETWEEN SURFACES (mm) | $N_d$ | $V_d$ |
|---|---|---|---|---|---|
| L1 | S1 | 216.550 | | | |
| | | | 6.243 | 1.491 | 57.2 |
| | S2 | 75.170 | | | |
| | | | 71.758 | | |
| L2 | S3 | 45.740 | | | |
| | | | 25.035 | 1.491 | 57.2 |
| | S4 | −421.862 | | | |
| | | | 0.239 | | |
| L3 | S5 | 293.042 | | | |
| | | | 21.064 | 1.491 | 57.2 |
| | S6 | −75.674 | | | |
| | | | 40.198 | | |
| L4 | S7 | −43.319 | | | |
| | | | 2.000 | 1.491 | 57.2 |
| | S8 | Plano | | | | f/No. = 1.13

-continued

| | EFL = 58.5 mm | | | |
|---|---|---|---|---|
| | Aspheric Surfaces S1, S2, S3, S4, S5, S6, S7 | | | |
| | S1 | S2 | S3 | S4 |
| D | $0.1457 \times 10^{-6}$ | $0.5279 \times 10^{-6}$ | $0.2673 \times 10^{-6}$ | $0.8443 \times 10^{-6}$ |
| E | $-0.2538 \times 10^{-11}$ | $0.1122 \times 10^{-10}$ | $0.5103 \times 10^{-10}$ | $0.3302 \times 10^{-9}$ |
| F | $0.4302 \times 10^{-14}$ | $0.1713 \times 10^{-12}$ | $0.1719 \times 10^{-12}$ | $0.1383 \times 10^{-13}$ |
| G | $0.6243 \times 10^{-17}$ | $-0.3523 \times 10^{-16}$ | $-0.7333 \times 10^{-16}$ | $-0.9837 \times 10^{-16}$ |
| H | $0.1216 \times 10^{-20}$ | $-0.7186 \times 10^{-21}$ | $-0.1611 \times 10^{-19}$ | $-0.6026 \times 10^{-21}$ |
| I | $-0.5961 \times 10^{-24}$ | $0.1922 \times 10^{-22}$ | $-0.1231 \times 10^{-22}$ | $0.2859 \times 10^{-23}$ |
| K | | .01 | $-1.00$ | |
| | S5 | S6 | S7 | |
| D | $-0.4808 \times 10^{-6}$ | $0.3266 \times 10^{-6}$ | $-0.9782 \times 10^{-5}$ | |
| E | $-0.1189 \times 10^{-9}$ | $0.2250 \times 10^{-10}$ | $0.4308 \times 10^{-9}$ | |
| F | $0.2669 \times 10^{-13}$ | $-0.2428 \times 10^{-13}$ | $-0.5173 \times 10^{-11}$ | |
| G | $0.3719 \times 10^{-16}$ | $-0.5035 \times 10^{-17}$ | $0.7128 \times 10^{-14}$ | |
| H | $0.5881 \times 10^{-20}$ | $-0.7435 \times 10^{-21}$ | $-0.2507 \times 10^{-17}$ | |
| I | $-0.3622 \times 10^{-23}$ | $-0.1628 \times 10^{-23}$ | $-0.8975 \times 10^{-20}$ | |
| K | .01 | | $-1.00$ | | where L1–L4 are lens elements from the image end, $N_d$ is the index of refraction of the lens elements, $V_d$ is the dispersion of the lens elements measured by their Abbe number, S1–S8 are successive lens surfaces from the image end, the surfaces where positive are on radii struck from the right and where negative are on radii struck from the left, and surfaces S1, S2, S3, S4, S5, S6, and S7 are aspheric as shown.

15. A lens according to claim 13, as scaled to an object diagonal of approximately five inches, defined substantially as follows:

| LENS | SURFACE | RADII (mm) | AXIAL DISTANCE BETWEEN SURFACES (mm) | $N_d$ | $V_d$ |
|---|---|---|---|---|---|
| L1 | S1 | 166.904 | | | |
| | | | 6.243 | 1.491 | 57.2 |
| | S2 | 75.237 | | | |
| | | | 77.259 | | |
| L2 | S3 | 46.372 | | | |
| | | | 25.035 | 1.491 | 57.2 |
| | S4 | −595.864 | | | |
| | | | 0.200 | | |
| L3 | S5 | 96.866 | | | |
| | | | 21.064 | 1.491 | 57.2 |
| | S6 | −210.113 | | | |
| | | | 37.481 | | |
| L4 | S7 | −56.167 | | | |
| | | | 2.000 | 1.491 | 57.2 |
| | S8 | Plano | | | |

| | f/No. = 1.13 | | | |
|---|---|---|---|---|
| | EFL = 59.3 mm | | | |
| | Aspheric Surfaces S1, S2, S3, S4, S5, S6, S7 | | | |
| | S1 | S2 | S3 | S4 |
| D | $0.2052 \times 10^{-7}$ | $0.4766 \times 10^{-6}$ | $0.3950 \times 10^{-6}$ | $0.4004 \times 10^{-6}$ |
| E | $-0.4349 \times 10^{-10}$ | $-0.1859 \times 10^{-9}$ | $0.6432 \times 10^{-10}$ | $0.1123 \times 10^{-9}$ |
| F | $-0.1139 \times 10^{-13}$ | $0.1535 \times 10^{-12}$ | $0.1770 \times 10^{-12}$ | $-0.4412 \times 10^{-13}$ |
| G | $0.2233 \times 10^{-17}$ | $-0.2795 \times 10^{-16}$ | $-0.5371 \times 10^{-16}$ | $-0.1053 \times 10^{-15}$ |
| H | $0.8935 \times 10^{-21}$ | $-0.6048 \times 10^{-20}$ | $0.5561 \times 10^{-20}$ | $0.4884 \times 10^{-20}$ |
| I | $-0.1971 \times 10^{-24}$ | $0.4819 \times 10^{-23}$ | $0.1286 \times 10^{-23}$ | $0.9480 \times 10^{-23}$ |
| K | | .01 | $-.10$ | |
| | S5 | S6 | S7 | |
| D | $0.2393 \times 10^{-6}$ | $0.1034 \times 10^{-5}$ | $-0.1547 \times 10^{-4}$ | |
| E | $0.1915 \times 10^{-9}$ | $0.7964 \times 10^{-9}$ | $0.7389 \times 10^{-8}$ | |
| F | $-0.2083 \times 10^{-13}$ | $0.1682 \times 10^{-12}$ | $-0.5424 \times 10^{-11}$ | |
| G | $-0.9563 \times 10^{-16}$ | $-0.3099 \times 10^{-15}$ | $-0.1575 \times 10^{-14}$ | |
| H | $-0.7131 \times 10^{-19}$ | $-0.2500 \times 10^{-18}$ | $-0.1023 \times 10^{-16}$ | |
| I | $-0.3804 \times 10^{-22}$ | $0.1140 \times 10^{-21}$ | $0.6243 \times 10^{-20}$ | |
| K | | | $-.10$ | | where L1–L4 are lens elements from the image end, $N_d$ is the index of refraction of the lens elements, $V_d$ is the dispersion of the lens elements measured by their Abbe number, S1–S8 are successive lens surfaces from the image end, the surfaces where positive are on radii struck from the right and where negative are on radii struck from the left, and surfaces S1, S2, S3, S4, S5, S6, and S7 are aspheric as shown.

16. A lens according to claim 13, as scaled to an object diagonal of approximately five inches, defined substantially as follows:

| SURFACE | AXIAL DISTANCE |
|---|---|

-continued

| LENS | | RADII (mm) | BETWEEN SURFACES (mm) | $N_d$ | $V_d$ |
|---|---|---|---|---|---|
| L1 | S1 | 246.760 | | | |
| | | | 6.243 | 1.491 | 57.2 |
| | S2 | 92.505 | | | |
| | | | 67.852 | | |
| L2 | S3 | 222.727 | | | |
| | | | 25.035 | 1.491 | 57.2 |
| | S4 | −61.535 | | | |
| | | | 0.016 | | |
| L3 | S5 | 79.276 | | | |
| | | | 21.064 | 1.491 | 57.2 |
| | S6 | −1551.181 | | | |
| | | | 47.784 | | |
| L4 | S7 | −134.500 | | | |
| | | | 2.000 | 1.491 | 57.2 |
| | S8 | Plano | | | | f/No. = 1.30
EFL - 60.4 mm

Aspheric Surfaces S1, S2, S3, S4, S5, S6, S7

| | S1 | S2 | S3 | S4 |
|---|---|---|---|---|
| D | $0.3934 \times 10^{-6}$ | $0.1331 \times 10^{-5}$ | $-0.1406 \times 10^{-5}$ | $-0.1758 \times 10^{-6}$ |
| E | $0.1373 \times 10^{-9}$ | $0.5398 \times 10^{-9}$ | $-0.1483 \times 10^{-9}$ | $-0.7773 \times 10^{-10}$ |
| F | $0.1155 \times 10^{-12}$ | $0.2896 \times 10^{-12}$ | $0.2898 \times 10^{-12}$ | $0.1598 \times 10^{-12}$ |
| G | $0.3658 \times 10^{-16}$ | $-0.4713 \times 10^{-16}$ | $0.5695 \times 10^{-15}$ | $0.2485 \times 10^{-15}$ |
| H | $-0.1159 \times 10^{-20}$ | $0.1012 \times 10^{-18}$ | $0.4875 \times 10^{-18}$ | $0.1691 \times 10^{-18}$ |
| I | $-0.6584 \times 10^{-23}$ | $0.2241 \times 10^{-21}$ | $-0.3747 \times 10^{-21}$ | $0.6309 \times 10^{-22}$ |
| K | | .01 | | −1.00 |

| | S5 | S6 | S7 |
|---|---|---|---|
| D | $0.7760 \times 10^{-6}$ | $-0.4956 \times 10^{-6}$ | $-0.6589 \times 10^{-5}$ |
| E | $0.3204 \times 10^{-9}$ | $-0.4122 \times 10^{-9}$ | $-0.8723 \times 10^{-9}$ |
| F | $-0.1895 \times 10^{-12}$ | $-0.1718 \times 10^{-12}$ | $-0.7774 \times 10^{-11}$ |
| G | $-0.2684 \times 10^{-15}$ | $-0.6347 \times 10^{-15}$ | $0.5907 \times 10^{-14}$ |
| H | $-0.1408 \times 10^{-18}$ | $0.5225 \times 10^{-18}$ | $-0.1019 \times 10^{-17}$ |
| I | $0.1588 \times 10^{-21}$ | $-0.7378 \times 10^{-22}$ | $-0.3378 \times 10^{-20}$ |
| K | −1.00 | | −1.00 | where L1-L4 are lens elements from the image end, $N_d$ is the index of refraction of the lens elements, $V_d$ is the dispersion of the lens elements measured by their Abbe number, S1-S8 are successive lens surfaces from the image end, the surfaces where positive are on radii struck from the right and where negative are on radii struck from the left, and surfaces S1, S2, S3, S4, S5, S6, and S7 are aspheric as shown.

17. A lens according to claim 13, as scaled to an object diagonal of approximately five inches, defined substantially as follows:

| LENS | | SURFACE RADII (mm) | AXIAL DISTANCE BETWEEN SURFACES (mm) | $N_d$ | $V_d$ |
|---|---|---|---|---|---|
| L1 | S1 | 146.930 | | | |
| | | | 66.243 | 1.491 | 57.2 |
| | S2 | 56.741 | | | |
| | | | 64.829 | | |
| L2 | S3 | 47.617 | | | |
| | | | 25.035 | 1.492 | 57.2 |
| | S4 | −624.122 | | | |
| | | | 0.239 | | |
| L3 | S5 | 208.956 | | | |
| | | | 21.064 | 1.491 | 57.2 |
| | S6 | −70.140 | | | |
| | | | 42.611 | | |
| L4 | S7 | −42.446 | | | |
| | | | 2.000 | 1.491 | 57.2 |
| | S8 | 779.240 | | | | f/No. = 1.16
EFL = 58.6 mm

Aspheric Surfaces S1, S2, S3, S4, S5, S6, S7, S8

| | S1 | S2 | S3 | S4 |
|---|---|---|---|---|
| D | $-0.1026 \times 10^{-6}$ | $0.3737 \times 10^{-6}$ | $0.2045 \times 10^{-6}$ | $0.7369 \times 10^{-6}$ |
| E | $-0.9636 \times 10^{-10}$ | $-0.1449 \times 10^{-9}$ | $-0.1423 \times 10^{-9}$ | $0.5642 \times 10^{-10}$ |
| F | $0.5512 \times 10^{-14}$ | $0.3349 \times 10^{-12}$ | $0.9892 \times 10^{-13}$ | $0.9767 \times 10^{-14}$ |
| G | $0.1553 \times 10^{-16}$ | $-0.8879 \times 10^{-16}$ | $-0.6524 \times 10^{-16}$ | $-0.8640 \times 10^{-16}$ |
| H | $0.2891 \times 10^{-20}$ | $-0.2552 \times 10^{-19}$ | $-0.3702 \times 10^{-20}$ | $0.2879 \times 10^{-20}$ |
| I | $-0.2098 \times 10^{-23}$ | $0.8072 \times 10^{-22}$ | $-0.8153 \times 10^{-23}$ | $0.2691 \times 10^{-23}$ |
| K | | .01 | −1.00 | |

| | S5 | S6 | S7 | S8 |
|---|---|---|---|---|
| D | $-0.4905 \times 10^{-6}$ | $0.6019 \times 10^{-6}$ | $-0.1063 \times 10^{-4}$ | $-0.1784 \times 10^{-5}$ |

-continued

| | | | | |
|---|---|---|---|---|
| E | $0.7089 \times 10^{-10}$ | $0.1516 \times 10^{-9}$ | $-0.1062 \times 10^{-8}$ | $0.7768 \times 10^{-9}$ |
| F | $0.1758 \times 10^{-13}$ | $-0.4171 \times 10^{-13}$ | $-0.4329 \times 10^{-11}$ | $-0.1799 \times 10^{-13}$ |
| G | $0.2095 \times 10^{-16}$ | $-0.7276 \times 10^{-17}$ | $0.9379 \times 10^{-14}$ | $-0.3822 \times 10^{-16}$ |
| H | $0.5110 \times 10^{-21}$ | $-0.7367 \times 10^{-22}$ | $-0.2215 \times 10^{-17}$ | $-0.2425 \times 10^{-20}$ |
| I | $-0.4245 \times 10^{-23}$ | $-0.2058 \times 10^{-23}$ | $-0.7526 \times 10^{-20}$ | $0.2987 \times 10^{-24}$ |
| K | .01 | | $-1.00$ | | where L1–L4 are lens elements from the image end, $N_d$ is the index of refraction of the lens elements, $V_d$ is the dispersion of the lens elements measured by their Abbe number, S1–S8 are successive lens surfaces from the image end, the surfaces where positive are on radii struck from the right and where negative are on radii struck from the left, and surfaces S1, S2, S3, S4, S5, S6, S7, and S8 are aspheric as shown.

18. A lens according to claim 13, as scaled to an object diagonal of approximately five inches, defined substantially as follows:

| LENS | | SURFACE RADII (mm) | AXIAL DISTANCE BETWEEN SURFACES (mm) | $N_d$ | $V_d$ |
|---|---|---|---|---|---|
| L1 | S1 | 167.615 | | | |
| | | | 6.243 | 1.491 | 57.2 |
| | S2 | 61.571 | | | |
| | | | 8.017 | | |
| L2 | S3 | 169.241 | | | |
| | | | 6.000 | 1.491 | 57.2 |
| | S4 | 313.028 | | | |
| | | | 36.937 | | |
| L3 | S5 | 47.382 | | | |
| | | | 26.000 | 1.491 | 57.2 |
| | S6 | −258.912 | | | |
| | | | 1.800 | | |
| L4 | S7 | 219.059 | | | |
| | | | 15.600 | 1.491 | 57.2 |
| | S8 | −66.734 | | | |
| | | | 36.124 | | |
| L5 | S9 | −37.402 | | | |
| | | | 2.000 | 1.491 | 57.2 |
| | S10 | Plano | | | | f/No. = 1.16
EFL = 59.3 mm

Aspheric Surfaces S1, S2, S3, S4, S5, S6, S7, S8, S9

| | S1 | S2 | S3 | S4 |
|---|---|---|---|---|
| D | $-0.4387 \times 10^{-6}$ | $-0.4902 \times 10^{-6}$ | $0.2103 \times 10^{-5}$ | $0.3272 \times 10^{-5}$ |
| E | $0.3231 \times 10^{-9}$ | $-0.6739 \times 10^{-9}$ | $0.1924 \times 10^{-9}$ | $0.1223 \times 10^{-8}$ |
| F | $0.1228 \times 10^{-13}$ | $0.6822 \times 10^{-12}$ | $0.3720 \times 10^{-13}$ | $0.2758 \times 10^{-12}$ |
| G | $0.2045 \times 10^{-16}$ | $-0.6941 \times 10^{-16}$ | $0.4164 \times 10^{-17}$ | $-0.2176 \times 10^{-15}$ |
| H | $0.3842 \times 10^{-20}$ | $-0.9358 \times 10^{-20}$ | $-0.7504 \times 10^{-19}$ | $-0.5323 \times 10^{-19}$ |
| I | $-0.2393 \times 10^{-24}$ | $0.1125 \times 10^{-21}$ | $-0.7800 \times 10^{-22}$ | $-0.2357 \times 10^{-21}$ |
| K | | .01 | −.10 | −.10 |

| | S5 | S6 | S7 |
|---|---|---|---|
| D | $0.5561 \times 10^{-6}$ | $0.1745 \times 10^{-6}$ | $-0.1424 \times 10^{-5}$ |
| E | $0.1013 \times 10^{-10}$ | $0.4263 \times 10^{-9}$ | $-0.4088 \times 10^{-9}$ |
| F | $0.1210 \times 10^{-12}$ | $-0.8047 \times 10^{-13}$ | $-0.3770 \times 10^{-13}$ |
| G | $-0.8672 \times 10^{-16}$ | $-0.8637 \times 10^{-16}$ | $0.1447 \times 10^{-16}$ |
| H | $0.2010 \times 10^{-20}$ | $0.1253 \times 10^{-19}$ | $-0.3821 \times 10^{-20}$ |
| I | $0.6581 \times 10^{-23}$ | $0.7957 \times 10^{-23}$ | $-0.6405 \times 10^{-23}$ |
| K | $-1.00$ | .01 | .01 |

| | S8 | S9 |
|---|---|---|
| D | $0.1481 \times 10^{-6}$ | $-0.1133 \times 10^{-4}$ |
| E | $0.8845 \times 10^{-10}$ | $0.1062 \times 10^{-7}$ |
| F | $-0.3592 \times 10^{-13}$ | $-0.2544 \times 10^{-10}$ |
| G | $0.9401 \times 10^{-18}$ | $0.1775 \times 10^{-13}$ |
| H | $-0.1344 \times 10^{-20}$ | $0.8784 \times 10^{-17}$ |
| I | $-0.4806 \times 10^{-23}$ | $-0.1615 \times 10^{-19}$ |
| K | | $-1.00$ | where L1–L5 are lens elements from the image end, $N_d$ is the index of refraction of the lens elements, $V_d$ is the dispersion of the lens elements measured by their Abbe number, S1–S10 are successive lens surfaces from the image end, the surfaces where positive are on radii struck from the right and where negative are on radii struck from the left, and surfaces S1, S2, S3, S4, S5, S6, S7, S8, and S9 are aspheric as shown.

19. A lens according to claim 13, as scaled to an object diagonal of approximately five inches, defined substantially as follows:

| LENS | | SURFACE RADII (mm) | AXIAL DISTANCE BETWEEN SURFACES (mm) | $N_d$ | $V_d$ |
|---|---|---|---|---|---|
| L1 | S1 | 642.408 | | | |
| | | | 12.755 | 1.491 | 57.2 |
| | S2 | −139.861 | | | |
| | | | 0.100 | | |

-continued

| | | | | | |
|---|---|---|---|---|---|
| L2 | S3 | 1192.621 | | | |
| | | | 6.243 | 1.491 | 57.2 |
| | S4 | 52.068 | | | |
| | | | 38.772 | | |
| L3 | S5 | 47.349 | | | |
| | | | 24.540 | 1.491 | 57.2 |
| | S6 | −244.468 | | | |
| | | | 0.239 | | |
| L4 | S7 | 137.310 | | | |
| | | | 19.205 | 1.491 | 57.2 |
| | S8 | −66.802 | | | |
| | | | 34.690 | | |
| L5 | S9 | −33.870 | | | |
| | | | 2.000 | 1.491 | 57.2 |
| | S10 | Plano | | | | f/No. - 1.16
EFL = 59.1 mm

Aspheric Surfaces S1, S2, S3, S4, S5, S6, S7, S8, S9

| | S1 | S2 | S3 |
|---|---|---|---|
| D | $0.7981 \times 10^{-07}$ | $0.2238 \times 10^{-6}$ | $-0.6941 \times 10^{-6}$ |
| E | $0.1890 \times 10^{-10}$ | $0.1252 \times 10^{-10}$ | $-0.9361 \times 10^{-10}$ |
| F | $0.1219 \times 10^{-13}$ | $0.2159 \times 10^{-14}$ | $0.4423 \times 10^{-13}$ |
| G | $0.2274 \times 10^{-17}$ | $0.1998 \times 10^{-17}$ | $0.2426 \times 10^{-16}$ |
| H | $0.2370 \times 10^{-21}$ | $0.5325 \times 10^{-21}$ | $0.6120 \times 10^{-21}$ |
| I | $0.1182 \times 10^{-24}$ | $-0.2579 \times 10^{-24}$ | $-0.4893 \times 10^{-23}$ |

| K | −5.00 | | |
|---|---|---|---|
| | S4 | S5 | S6 |
| D | $0.3545 \times 10^{-6}$ | $0.6922 \times 10^{-6}$ | $0.6657 \times 10^{-6}$ |
| E | $0.2113 \times 10^{-9}$ | $-0.4598 \times 10^{-10}$ | $0.4229 \times 10^{-9}$ |
| F | $0.3290 \times 10^{-14}$ | $0.9031 \times 10^{-13}$ | $-0.4867 \times 10^{-13}$ |
| G | $-0.1981 \times 10^{-15}$ | $-0.8441 \times 10^{-16}$ | $-0.1235 \times 10^{-15}$ |
| H | $0.1905 \times 10^{-18}$ | $-0.3861 \times 10^{-20}$ | $0.1870 \times 10^{-20}$ |

-continued

| | | | |
|---|---|---|---|
| I | $0.3420 \times 10^{-21}$ | $-0.3893 \times 10^{-23}$ | $0.9654 \times 10^{-23}$ |
| K | .01 | −1.00 | .01 |

| | S7 | S8 | S9 |
|---|---|---|---|
| D | $-0.8942 \times 10^{-6}$ | $0.1801 \times 10^{-6}$ | $-0.9686 \times 10^{-5}$ |
| E | $-0.3251 \times 10^{-9}$ | $0.3124 \times 10^{-9}$ | $0.2100 \times 10^{-8}$ |
| F | $0.8248 \times 10^{-13}$ | $0.1344 \times 10^{-13}$ | $-0.1940 \times 10^{-10}$ |
| G | $0.6633 \times 10^{-16}$ | $0.1830 \times 10^{-17}$ | $0.1882 \times 10^{-13}$ |
| H | $0.1286 \times 10^{-19}$ | $0.1112 \times 10^{-20}$ | $0.1225 \times 10^{-16}$ |
| I | $-0.2432 \times 10^{-23}$ | $-0.1887 \times 10^{-23}$ | $-0.2295 \times 10^{-19}$ |
| K | .01 | | −1.00 | where L1–L5 are lens elements from the image end, $N_d$ is the index of refraction of the lens elements, $V_d$ is the dispersion of the lens elements measured by their Abbe number, S1–S10 are successive lens surfaces from the image end, the surfaces where positive are on radii struck from the right and where negative are on radii struck from the left, and surfaces S1, S2, S3, S4, S5, S6, S7, S8, and S9 are aspheric as shown.

20. A lens according to claim 13, as scaled to an object diagonal of approximately five inches, defined substantially as

| LENS | | SURFACE RADII (mm) | AXIAL DISTANCE BETWEEN SURFACES (mm) | $N_d$ | $V_d$ |
|---|---|---|---|---|---|
| L1 | S1 | 127.389 | | | |
| | | | 6.243 | 1.491 | 57.2 |
| | S2 | 56.948 | | | |
| | | | 34.042 | | |
| L2 | S3 | 224.180 | | | |
| | | | 7.000 | 1.491 | 57.2 |
| | S4 | −106.944 | | | |
| | | | 17.452 | | |
| L3 | S5 | 429.048 | | | |
| | | | 21.500 | 1.491 | 57.2 |
| | S6 | −59.651 | | | |
| | | | 0.217 | | |
| L4 | S7 | 103.738 | | | |
| | | | 10.992 | 1.491 | 57.2 |
| | S8 | −798.572 | | | |
| | | | 39.230 | | |
| L5 | S9 | −49.054 | | | |
| | | | 2.000 | 1.491 | 57.2 |
| | S10 | Plano | | | | f/No. = 1.16
EFL = 59.9 mm

Aspheric Surfaces S1, S2, S3, S4, S5, S7, S8, S9

| | S1 | S2 | S3 | S4 |
|---|---|---|---|---|
| D | $-0.6256 \times 10^{-6}$ | $-0.1008 \times 10^{-6}$ | $-0.2997 \times 10^{-5}$ | $-0.1214 \times 10^{-5}$ |
| E | $0.5850 \times 10^{-9}$ | $0.3756 \times 10^{-9}$ | $-0.1534 \times 10^{-8}$ | $-0.2125 \times 10^{-9}$ |
| F | $-0.7773 \times 10^{-13}$ | $0.7565 \times 10^{-12}$ | $0.9141 \times 10^{-12}$ | $0.1425 \times 10^{-12}$ |
| G | $-0.1671 \times 10^{-16}$ | $-0.2120 \times 10^{-16}$ | $0.9078 \times 10^{-15}$ | $0.9688 \times 10^{-15}$ |
| H | $-0.2267 \times 10^{-20}$ | $-0.2762 \times 10^{-18}$ | $0.3723 \times 10^{-18}$ | $0.2489 \times 10^{-18}$ |
| I | $0.2325 \times 10^{-23}$ | $0.1459 \times 10^{-21}$ | $-0.6479 \times 10^{-21}$ | $-0.4171 \times 10^{-21}$ |
| K | | .01 | −.10 | −.10 |

| | S5 | S7 | S8 | S9 |
|---|---|---|---|---|
| D | $0.3188 \times 10^{-7}$ | $0.1588 \times 10^{-5}$ | $0.1361 \times 10^{-5}$ | $-0.9237 \times 10^{-5}$ |
| E | $-0.8748 \times 10^{-11}$ | $0.1207 \times 10^{-8}$ | $0.3639 \times 10^{-9}$ | $0.7308 \times 10^{-8}$ |
| F | $0.1001 \times 10^{-14}$ | $0.6279 \times 10^{-13}$ | $0.6304 \times 10^{-12}$ | $-0.2337 \times 10^{-10}$ |
| G | $0.8191 \times 10^{-17}$ | $0.1102 \times 10^{-15}$ | $0.2434 \times 10^{-15}$ | $0.1918 \times 10^{-13}$ |
| H | $0.2566 \times 10^{-20}$ | $0.3738 \times 10^{-18}$ | $0.5628 \times 10^{-19}$ | $0.1947 \times 10^{-17}$ |
| I | $-0.2504 \times 10^{-23}$ | $-0.1257 \times 10^{-21}$ | $-0.2897 \times 10^{-21}$ | $-0.9905 \times 10^{-20}$ |
| K | | | .01 | −1.0 | where L1–L5 are lens elements from the image end, $N_d$ is the index of refraction of the lens elements, $V_d$ is the dispersion of the lens elements measured by their Abbe number, S1–S10 are successive lens surfaces from the image end, the surfaces where positive are on radii struck from the right and where negative are on radii struck from the left, and surfaces S1, S2, S3, S4, S5, S7, S8, and S9 are aspheric as shown.

21. A lens according to claim 13, as scaled to an object diagonal of approximately five inches, defined substantially as follows:

| LENS | | SURFACE RADII (mm) | AXIAL DISTANCE BETWEEN SURFACES (mm) | $N_d$ | $V_d$ |
|---|---|---|---|---|---|
| L1 | S1 | 127.931 | | | |
| | | | 6.300 | 1.491 | 57.2 |
| | S2 | 57.092 | | | |
| | | | 34.090 | | |
| L2 | S3 | 222.500 | | | |
| | | | 7.600 | 1.491 | 57.2 |
| | S4 | −106.510 | | | |
| | | | 18.447 | | |
| L3 | S5 | 475.181 | | | |
| | | | 19.797 | 1.517 | 64.2 |
| | S6 | −61.926 | | | |
| | | | 0.260 | | |
| L4 | S7 | 104.647 | | | |
| | | | 11.000 | 1.491 | 57.2 |
| | S8 | −922.486 | | | |
| | | | 39.155 | | |
| L5 | S9 | −49.326 | | | |
| | | | 2.000 | 1.491 | 57.2 |
| | S10 | Plano | | | | f/No. = 1.16
EFL = 59.9 mm

Aspheric Surfaces S1, S2, S3, S4, S7, S8, S9

| | S1 | S2 | S3 | S4 |
|---|---|---|---|---|
| D | $-0.6610 \times 10^{-6}$ | $-0.2060 \times 10^{-6}$ | $-0.3027 \times 10^{-5}$ | $-0.1253 \times 10^{-5}$ |
| E | $-0.6142 \times 10^{-13}$ | $0.4789 \times 10^{-9}$ | $-0.1450 \times 10^{-8}$ | $-0.1931 \times 10^{-9}$ |
| F | $-0.6622 \times 10^{-13}$ | $0.7782 \times 10^{-12}$ | $0.9528 \times 10^{-12}$ | $0.1797 \times 10^{-12}$ |
| G | $-0.1393 \times 10^{-16}$ | $-0.3658 \times 10^{-16}$ | $0.9204 \times 10^{-15}$ | $0.9855 \times 10^{-15}$ |
| H | $-0.2430 \times 10^{-20}$ | $-0.2609 \times 10^{-18}$ | $0.3834 \times 10^{-18}$ | $0.2385 \times 10^{-18}$ |
| I | $0.1563 \times 10^{-23}$ | $0.1876 \times 10^{-21}$ | $-0.6338 \times 10^{-21}$ | $-0.4361 \times 10^{-21}$ |
| K | | .01 | −.10 | −.10 |

| | S7 | S8 | S9 |
|---|---|---|---|
| D | $0.1513 \times 10^{-5}$ | $0.1170 \times 10^{-5}$ | $-0.9168 \times 10^{-5}$ |
| E | $0.1125 \times 10^{-8}$ | $0.3626 \times 10^{-9}$ | $0.7186 \times 10^{-8}$ |
| F | $0.4918 \times 10^{-13}$ | $0.5665 \times 10^{-12}$ | $-0.2363 \times 10^{-10}$ |
| G | $0.1133 \times 10^{-15}$ | $0.1747 \times 10^{-15}$ | $0.1905 \times 10^{-13}$ |
| H | $0.3723 \times 10^{-18}$ | $0.5614 \times 10^{-19}$ | $0.2074 \times 10^{-17}$ |
| I | $-0.1457 \times 10^{-21}$ | $-0.2520 \times 10^{-21}$ | $-0.9613 \times 10^{-20}$ |
| K | | .01 | −1.0 | where L1–L5 are lens elements from the image end, $N_d$ is the index of refraction of the lens elements, $V_d$ is the dispersion of the lens elements measured by their Abbe number, S1–S10 are successive lens surfaces from the image end, the surfaces where positive are on radii struck from the right and where negative are on radii struck from the left, and surfaces S1, S2, S3, S4, S7, S8, and S9 are aspheric as shown.

22. A projection lens comprising from the image end a first negative lens unit having at least one aspheric surface, a second positive lens unit, and a third negative lens unit having an aspheric surface concave to the image, said first lens unit serving as an aberration corrector and contributing negative optical power to the overall lens, and contributing to field flattening, said second lens unit consisting of at least two elements having facing convex surfaces with at least one of said facing surfaces being aspheric, said facing convex surfaces being defined on radii at the optical axis which are essentially equal to or greater than the equivalent focal length of the lens, said third lens unit contributing the majority of correction of field curvature of said lens.

23. The lens of claim 22 where said first lens unit has an optical power $K_1$, the overall lens has an optical power $K_0$, and $$0.4 > |K_1/K_0| > 0.15$$

24. The lens of claim 22 where said first lens unit has a convex image side surface and a concave object side surface.

25. The lens of claim 24 where said first lens unit consists of an overall meniscus shaped lens.

26. The lens of claim 24 where said first lens unit comprises at least two elements.

27. The lens of claim 24 where $$1.3 > K_2/K_0 > 0.9$$

where $K_2$ is the optical power of said second lens unit and $K_0$ is the optical power of the overall lens.

28. The lens of claim 22 where said second lens unit is overall biconvex.

29. The lens of claim 22 where said second lens unit consists of at least two lens elements and at least one is biconvex.

30. The lens of claim 22 where said second lens unit consists of two biconvex elements.

31. The lens of claim 22 where said second lens unit has elements with aspheric facing surfaces which are axially spaced no more than one percent of the equivalent focal length of said lens.

32. The lens of claim 22 where the axial spacing $D_{12}$ of said first lens unit from said second lens unit and the axial spacing of said second lens unit from said third lens unit $D_{23}$ are $$1.4 > D_{12}/EFL > 0.5$$

$$0.9 > D_{23}/EFL > 0.5$$

where EFL is the equivalent focal length of the lens.

33. The lens of claim 22 where the axial spacing between said first and second lens units is between 0.5 and 1.4 of the equivalent focal length of the lens.

34. The lens of claim 22 where the axial spacing between said second and third lens units is between 0.5 and 0.8 of the equivalent focal length of the lens.

35. A projection lens according to claim 22 wherein the aspheric surfaces on the elements thereof have best fitting spherical surfaces defined by points at the extremes of the clear aperture of said aspheric surfaces and points on the aspheric surface intermediate the extreme of the clear aperture of the aspheric surface and the optical axis of said surface, said lens units having optical powers as calculated with said best fitting spherical surfaces $$1.5 > |K_1/K_0| > 0.2$$

$$5.0 > K_3/K_0 > 0.6$$

where $K_1$ is the optical power of said surface first lens unit as calculated with a best fitting spherical surface for said at least one aspherical surface, $K_3$ is the optical power of said third lens unit as calculated with a best fitting spherical surface for said at least one aspherical surface, and $K_0$ is the optical power of the overall lens as calculated for all best fitting spherical surfaces.

36. The lens of claim 35 where said second lens group consists of two elements, each having at least one aspheric surface, and $$4.0 > K_2/K_0 > 1.0$$

where $K_2$ is the optical power of said second lens unit as calculated on the basis of the best fitting spherical surface for the aspheric surfaces and $K_0$ is the overall optical power of the lens as calculated for all best fitting spherical surfaces.

37. The lens of claim 35 where all surfaces of said second lens unit are aspheric.

38. The lens of claim 35 where the facing surfaces of the elements of said second lens unit are aspheric.

39. The lens of claim 35 where the second lens group consists of three elements and $$4.0 > K_2/K_0 > 1.0$$

where $K_2$ is the optical power of said second lens unit as calculated on the basis of the best fitting spherical surface for the aspheric surfaces and $K_0$ is the overall optical power of the lens as calculated for all best fitting spherical surfaces.

40. A projection lens comprising from the image end a first negative lens unit having at least one aspheric surface, a second positive lens unit, and a third negative lens unit having an aspheric surface concave to the image, said first lens unit having sufficient negative optical power to contribute to field flattening, said second lens unit consisting of at least two elements having facing surfaces with at least one of said facing surfaces being aspheric, said third lens unit contributing the majority of field flattening of the overall lens, said first lens unit having an optical power $K_1$, the overall lens having an optical power $K_0$, and $$0.4 > |K_1/K_0| > 0.15$$

41. The lens of claim 40 where said first lens unit has a convex image side surface and a concave object side surface.

42. The lens of claim 41 where said first lens unit consists of an overall meniscus shaped lens.

43. The lens of claim 41 where said first lens unit comprises at least two elements.

44. The lens of claim 40 where $$1.3 > K_2/K_0 > 0.9$$

where $K_2$ is the optical power of said second lens unit as calculated from radii at the optical axis of said lens.

45. The lens of claim 40 where said second lens unit is overall biconvex.

46. The lens of claim 40 where said second lens unit consists of at least two lens elements and at least one is biconvex.

47. The lens of claim 40 where said second lens unit consists of two biconvex elements.

48. The lens of claim 40 where said second lens unit has elements with aspheric facing surfaces which are axially spaced no more than one percent of the equivalent focal length of said lens.

49. The lens of claim 40 where the axial spacing $D_{12}$ of said first lens unit from said second lens unit and the axial spacing of said second lens unit from said third lens unit $D_{23}$ are $$1.4 > D_{12}/EFL > 0.5$$

$$0.9 > D_{23}/EFL > 0.5$$

where EFL is the equivalent focal length of the lens.

50. The lens of claim 40 where the axial spacing between said first and second lens units is between 0.5 and 1.4 of the equivalent focal length of the lens.

51. The lens of claim 40 where the axial spacing between said second and third lens units is between 0.5 and 0.8 of the equivalent focal length of the lens.

52. A projection lens according to claim 40 wherein the aspheric surfaces on the elements thereof have best fitting spherical surfaces defined by points at the extremes of the clear aperture of said aspheric surfaces and pointson the aspheric surface intermediate the extreme of the clear aperture of the aspheric surface and the optical axis of said surface, said lens units having optical powers as calculated with said best fitting spherical surfaces $$1.5 > |K_1/K_0| > 0.2$$

$$5.0 > K_3/K_0 > 0.6$$

where $K_1$ is the optical power of said surface first lens unit as calculated with a best fitting spherical surface for said at least one aspherical surface, $K_3$ is the optical power of said third lens unit as calculated with a best fitting spherical surface for said at least one aspherical surface, and $K_0$ is the optical power of the overall lens as calculated for all best fitting spherical surfaces.

53. The lens of claim 52 where said second lens group consists of two elements, each having at least one aspheric surface, and $$4.0 > K_2/K_0 > 1.0$$

where $K_2$ is the optical power of said second lens unit as calculated on the basis of the best fitting spherical surface for the aspheric surfaces and $K_0$ is the overall optical power of the lens as calculated for all best fitting spherical surfaces.

54. The lens of claim 52 where all surfaces of said second lens unit are aspheric.

55. The lens of claim 52 where the facing surfaces of the elements of said second lens unit are aspheric.

56. The lens of claim 52 where the second lens group consists of three elements and $$4.0 > K_2/K_0 > 1.0$$

where $K_2$ is the optical power of said second lens unit as calculated on the basis of the best fitting spherical surface for the aspheric surfaces and $K_0$ is the overall optical power of the lens as calculated for all best fitting spherical surfaces.

57. A projection lens adapted to be closely coupled to an object comprising from the image end a first lens unit of negative power, a second lens unit supplying all of the positive power of said lens and a third negative lens unit having a concave image side surface and serving as a field flattener, said second lens unit comprising two positive elements having facing surfaces which are defined on radii at the optical axis which are essentially equal to or greater than the equivalent focal length of said lens, said second lens unit having at least two aspheric surfaces and at least one of said facing surfaces of said elements of said second lens unit being aspheric, said first lens unit also contributing to correction for field curvature, and the optical power of said first lens unit is $$0.4 > |K_1/K_0| > 0.15$$

where $K_1$ is the optical power of said first lens unit and $K_0$ is the optical power of said projection lens.

58. The projection lens of claim 57 where said second lens unit has at least three aspheric surfaces.

59. The projection lens of claim 57 where said second lens unit has four aspheric surfaces.

60. The projection lens of claim 57 where $$0.9 > |K_3/K_0| > 0.2$$

where $K_3$ is the power at the optical axis of said third lens unit and $K_0$ is the power of said projection lens.

61. A projection lens adapted to be closely coupled to the screen of a cathode ray tube comprising from the image end a first lens unit of negative power having at least one aspheric surface and contributing to correction of aperture dependent aberrations, a second lens unit providing all the positive power of said lens and contributing to correction of aberrations introduced by said first lens unit, and a third negative lens unit having an aspheric concave image side surface and contributing to correction of field curvature, said first lens unit also substantially contributing to correction of field curvature, the optical power of said first lens unit being $$0.4 > |K_1/K_0| > 0.15$$

where $K_1$ is the optical power of said first lens unit and $K_0$ is the optical power of said projection lens.

62. The lens of claim 61 where said second lens unit comprises at least two elements and said at least two elements of said second lens unit are defined on radii at the optical axis which is essentially equal to or greater than the equivalent focal length of said projection lens.

63. The projection lens of claim 61 where said second lens unit has at least three aspheric surfaces.

64. The projection lens of claim 61 where said second lens unit has four aspheric surfaces.

65. The projection lens of claim 61 where $$0.9 > |K_3/K0| > 0.2$$

where $K_3$ is the power at the optical axis of said third lens unit and $K_0$ is the power of said projection lens.

66. The lens of claim 61 where the axial spacing between said two elements of said second lens unit is no more than 0.1 of the equivalent focal length of said projection.

67. The lens of claim 61 where the axial spacing between said two elements of said second lens unit is no more than 0.1 of the equivalent focal length of said projection.

* * * * *

(12) EX PARTE REEXAMINATION CERTIFICATE (5201st)
United States Patent
Betensky

(10) Number: US 4,801,196 C1
(45) Certificate Issued: Sep. 13, 2005

(54) WIDE ANGLE PROJECTION LENS

(75) Inventor: Ellis I. Betensky, Redding, CT (US)

(73) Assignee: 3M Innovative Properties Company, St. Paul, MN (US)

Reexamination Request:
No. 90/006,988, Apr. 1, 2004

Reexamination Certificate for:
Patent No.: 4,801,196
Issued: Jan. 31, 1989
Appl. No.: 06/776,140
Filed: Sep. 13, 1985

Related U.S. Application Data

(63) Continuation-in-part of application No. 06/652,062, filed on Sep. 19, 1984, now Pat. No. 4,707,084, which is a continuation-in-part of application No. 06/642,825, filed on Aug. 21, 1984, now Pat. No. 4,697,892, which is a continuation-in-part of application No. 06/543,017, filed on Oct. 18, 1983, now abandoned.

(51) Int. Cl.[7] .............................. G02B 3/00; G02B 9/00
(52) U.S. Cl. ........................ 359/649; 359/708; 359/782

(56) References Cited

U.S. PATENT DOCUMENTS

| | | | |
|---|---|---|---|
| 4,469,413 A | 9/1984 | Shirayanagi | 359/718 |
| 4,620,773 A | 11/1986 | Fukuda | 359/650 |
| 4,682,861 A | 7/1987 | Hosoya | 359/650 |
| 4,753,519 A | 6/1988 | Miyatake | 359/650 |
| 4,810,075 A | 3/1989 | Fukuda | 359/650 |

*Primary Examiner*—Jordan M Schwartz

(57) ABSTRACT

A wide angle projections lens which comprises from the image end a first lens unit of negative power having at least one aspheric surface, a second positive lens unit comprising at least two elements and a third negative element having an aspheric concave to the image, where the first lens unit provides negative power to the overall lens and serves as an aberration corrector including some field curvature.

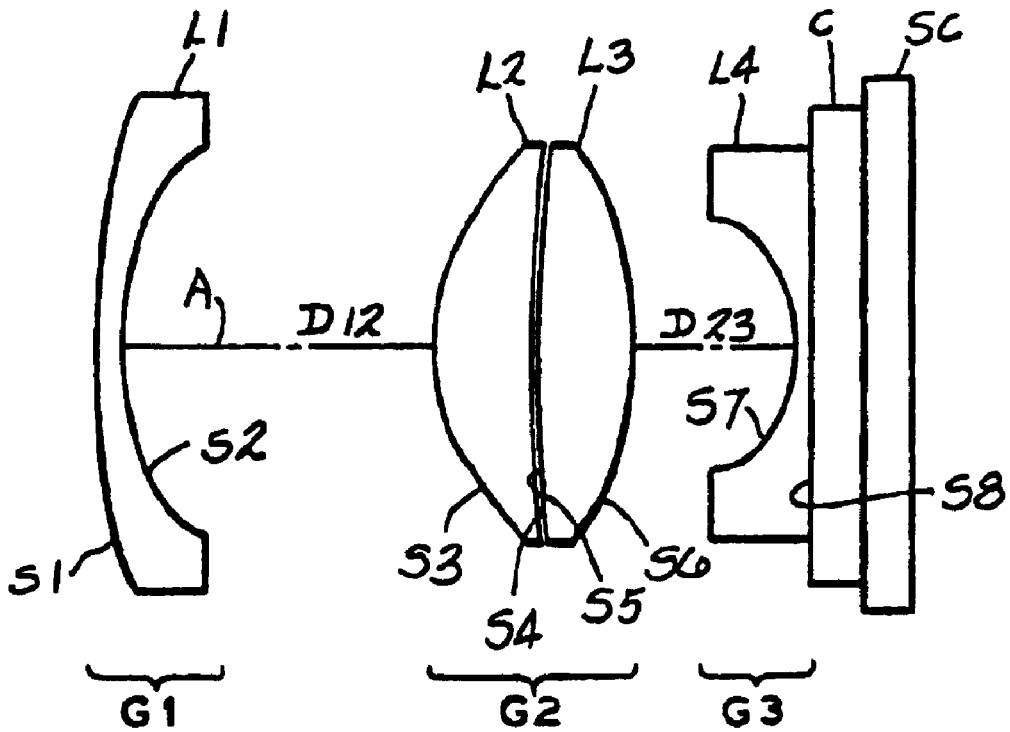

US 4,801,196 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 22, 40, 57 and 61 are determined to be patentable as amended.

Claims 2–21, 23–39, 41–56, 58–60 and 62–67, dependent on an amended claim, are determined to be patentable.

1. A projection lens comprising from the image end a negative lens unit having at least one aspheric surface, a positive lens unit, and a negative lens unit having an aspheric surface concave to the image, said first lens unit *being negative at the optical axis and* serving as an aberration corrector and contributing negative optical power to the overall lens, said third lens unit contributing to field flattening, said first lens unit also contributing to field flattening, and $$0.4 > |K_1/K_0| > 0.15$$

$$0.9 > |K_3/K_0| > 0.2$$

where $K_1$ and $K_3$ are the optical powers of said first and third lens units at the optical axis and $K_0$ is the optical power of the overall lens, determined at the optical axis.

22. A projection lens comprising from the image end a first negative lens unit having at least one aspheric surface, a second positive lens unit, and a third negative lens unit having an aspheric surface concave to the image, said first lens unit *being negative at the optical axis and* serving as an aberration corrector and contributing negative optical power to the overall lens, and contributing to field flattening, said second lens unit consisting of at least two elements having facing convex surfaces with at least one of said facing surfaces being aspheric, said facing convex surfaces being defined on radii at the optical axis which are essentially equal to or greater than the equivalent focal length of the lens, said third lens unit contributing the majority of correction of field curvature of said lens.

40. A projection lens comprising from the image end a first negative lens unit having at least one aspheric surface, a second positive lens unit, and a third negative lens unit having an aspheric surface concave to the image, said first lens unit *being negative at the optical axis and* having sufficient negative optical power to contribute to field flattening, said second lens unit consisting of at least two elements having facing surfaces with at least one of said facing surfaces being aspheric, said third lens unit contributing the majority of field flattening of the overall lens, said first lens unit having an optical power $K_1$, the overall lens having an optical power $K_0$, and $$0.4 > |K_1/K_0| > 0.15.$$

57. A projection lens adapted to be closely coupled to an object comprising from the image end a first lens unit of negative power, a second lens unit supplying all of the positive power of said lens and a third negative lens unit having a concave image side surface and serving as a field flattener, said second lens unit comprising two positive elements having facing surfaces which are defined on radii at the optical axis which are essentially equal to or greater than the equivalent focal length of said lens, said second lens unit having at least two aspheric surfaces and at least one of said facing surfaces of said elements of said second lens unit being aspheric, said first lens unit *being negative at the optical axis and* also contributing to correction for field curvature, and the optical power of said first lens unit is $$0.4 > |K_1/K_0| > 0.15$$

where $K_1$ is the optical power of said first lens unit and $K_0$ is the optical power of said projection lens.

61. A projections lens adapted to be closely coupled to the screen of a cathode ray tube comprising from the image end a first lens unit of negative power having at least one aspheric surface and contributing to correction of aperture dependent aberrations, a second lens unit providing all the positive power of said lens and contributing to correction of aberrations introduced by said first lens unit, and a third negative lens unit having an aspheric concave image side surface and contributing to correction of field curvature, said first lens unit *being negative at the optical axis and* also substantially contributing to correction of field curvature, the optical power of said first lens unit being $$0.4 > |K_1/K_0| > 0.15$$

where $K_1$ is the optical power of said first lens unit and $K_0$ is the optical power of said projection lens.

* * * * *